US011445438B2

(12) United States Patent
Choo et al.

(10) Patent No.: US 11,445,438 B2
(45) Date of Patent: Sep. 13, 2022

(54) FULL-DUPLEX COMMUNICATION METHOD DURING TARGET WAKE TIME SERVICE PERIOD IN HIGH EFFICIENT WIRELESS LAN NETWORK AND STATION APPARATUS

(71) Applicant: SENSCOMM SEMICONDUCTOR CO., LTD., Jiangsu (CN)

(72) Inventors: Seung Ho Choo, Irvine, CA (US); Jin Won Kang, Tustin, CA (US); Sang Min Shim, Irvine, CA (US); DaeHong Kim, Irvine, CA (US)

(73) Assignee: SENSCOMM SEMICONDUCTOR CO., LTD., Jiangsu (CN)

( * ) Notice: Subject to any disclaimer, the term of this patent is extended or adjusted under 35 U.S.C. 154(b) by 0 days.

(21) Appl. No.: 16/979,818

(22) PCT Filed: Mar. 12, 2019

(86) PCT No.: PCT/CN2019/077738
§ 371 (c)(1),
(2) Date: Sep. 10, 2020

(87) PCT Pub. No.: WO2019/174557
PCT Pub. Date: Sep. 19, 2019

(65) Prior Publication Data
US 2021/0058862 A1    Feb. 25, 2021

Related U.S. Application Data

(60) Provisional application No. 62/641,832, filed on Mar. 12, 2018, provisional application No. 62/641,862, filed on Mar. 12, 2018.

(51) Int. Cl.
*H04W 52/02*   (2009.01)
*H04L 5/14*   (2006.01)
(Continued)

(52) U.S. Cl.
CPC ....... *H04W 52/0216* (2013.01); *H04L 5/1469* (2013.01); *H04W 72/0446* (2013.01); *H04W 84/12* (2013.01)

(58) Field of Classification Search
CPC ......... H04W 52/0216; H04W 72/0446; H04W 84/12; H04L 5/1469
See application file for complete search history.

(56) References Cited

U.S. PATENT DOCUMENTS 10,681,679 B1 *   6/2020   Cheng .................. H04L 5/00
2015/0029905 A1 *   1/2015   Yi ..................... H04L 5/0055
370/277

(Continued)

FOREIGN PATENT DOCUMENTS

EP        3 188 429 A1       7/2017
KR     10-1529672 B1       6/2015
(Continued)

OTHER PUBLICATIONS

International Search Report for PCT/CN2019/077738 dated Jun. 12, 2019 from Chinese National Intellectual Property Administration.
(Continued)

*Primary Examiner* — Mohammad S Anwar
(74) *Attorney, Agent, or Firm* — Paratus Law Group, PLLC

(57) ABSTRACT

A full-duplex communication method in a target wake time (TWT) service period of a high-efficiency wireless local area network (WLAN) is performed by a TWT responding station, and includes transmitting TWT schedule information to at least one TWT requesting station; transmitting information regarding a resource unit (RU) to the at least one TWT requesting station through a reference frame in a TWT service period (SP); receiving an uplink frame from the TWT requesting station in a time period determined on the basis of the reference frame through the RU; and transmit- (Continued)

ting a downlink frame to the TWT requesting station in a specific time duration of the time period. The uplink frame and the downlink frame are transmitted through the same channel.

17 Claims, 17 Drawing Sheets

(51) Int. Cl.
*H04W 72/04* (2009.01)
*H04W 84/12* (2009.01)

(56) References Cited

U.S. PATENT DOCUMENTS

| | | | |
|---|---|---|---|
| 2016/0219510 A1* | 7/2016 | Asterjadhi | H04W 52/0216 |
| 2016/0316455 A1* | 10/2016 | Asterjadhi | H04W 74/0816 |
| 2016/0364350 A1* | 12/2016 | Sanghi | G06F 13/4027 |
| 2016/0366254 A1 | 12/2016 | Asterjadhi et al. | |
| 2017/0055284 A1 | 2/2017 | Min et al. | |
| 2017/0064625 A1 | 3/2017 | Sampath et al. | |
| 2017/0127404 A1 | 5/2017 | Merlin et al. | |

FOREIGN PATENT DOCUMENTS

| | | |
|---|---|---|
| KR | 10-2017-0109556 A | 9/2017 |
| WO | WO 2017/035293 A1 | 3/2017 |

OTHER PUBLICATIONS

Extended European Search Report for related EP application No. 19766709.0 dated Dec. 13, 2021 from European Patent Office.

LAN/MAN Standards Committee of the IEEE Computer Society, "Draft Standard for Information technology—Telecommunications and information exchange between systems Local and metropolitan area networks—Specific requirements", IEEE P802.11ax/D2.2, Feb. 14, 2018, pp. 1-620.

Abhishek Patil et al., "Resolution for CID 13136", IEEE 802.11-18/03630, Mar. 6, 2018, pp. 1-3.

Qiao Qu et al., "MU-FuPlex: a Multiuser Full-duplex MAC Protocol for the Next Generation Wireless Networks", 2017 IEEE Wireless communications and networking conference (WCNC), IEEE, Mar. 19, 2017, pp. 1-6.

* cited by examiner (A)

(B)

(A)

(B)

(A)

(B)

FULL-DUPLEX COMMUNICATION METHOD DURING TARGET WAKE TIME SERVICE PERIOD IN HIGH EFFICIENT WIRELESS LAN NETWORK AND STATION APPARATUS

CROSS REFERENCE TO PRIOR APPLICATION

This application is a National Stage Patent Application of PCT International Patent Application No. PCT/CN2019/077738 (filed on Mar. 12, 2019) under 35 U.S.C. § 371, which claims priority to U.S. Provisional Application Nos. 62/641,832 (filed on Mar. 12, 2018) and 62/641,862 (filed on Mar. 12, 2018) which are all hereby incorporated by reference in their entirety.

BACKGROUND

The following description relates to a technique for performing in-band full-duplex communication in a power saving mode of a high-efficiency wireless local area network (WLAN).

In a wireless local area network (WLAN), a single basic service set (BSS) is composed of two kinds of entity which are a single AP Station (STA) and multiple non-AP STAs. STAs share a same radio frequency channel with one out of WLAN operation bandwidth options (e.g. 20/40/80/160 MHz). Here, AP STA and non-AP STA could be referred as AP and STA, respectively.

the legacy IEEE 802.11a/b/g/n/ac standard does not guarantee communication stability in dense environments with many users. In order to overcome this limit, the High-Efficiency WLAN Study Group (HEW SG) and the IEEE Task Group ax (TGax) were formed by IEEE 802.11 working group, which has worked on the standardization of IEEE 80211ax as the next generation of WLAN standard. The IEEE 802.11ax standard aims to improve system throughput in dense environments with many APs and STAs. Also, a new power saving technology which is called TWT, target wake time, was employed for efficient communication in dense WLAN environment.

SUMMARY

Full-duplex (FD) communication is one of promising next-generation wireless technologies. This technology enables up to double network throughput ideally because the information can be transmitted and received between wireless communication nodes through the same channel at the same time. In recent FD communication becomes more feasible thanks to the enhancement of self-interference cancellation (SIC) technology.

The following description is intended to provide full-duplex communication between an AP and an STA in TWT power saving mode that supports an IEEE 802.11ax environment.

The following description enables full-duplex communication in a power saving mode of IEEE 802.11ax while maintaining backward compatibility with the current IEEE 802.11 standards (802.11a/b/g/n/ac). The following description provides a communication protocol for canceling interference between an uplink signal and a downlink signal that are carried through the same channel at the same time in the power saving mode of IEEE 802.11ax.

Figure 1:
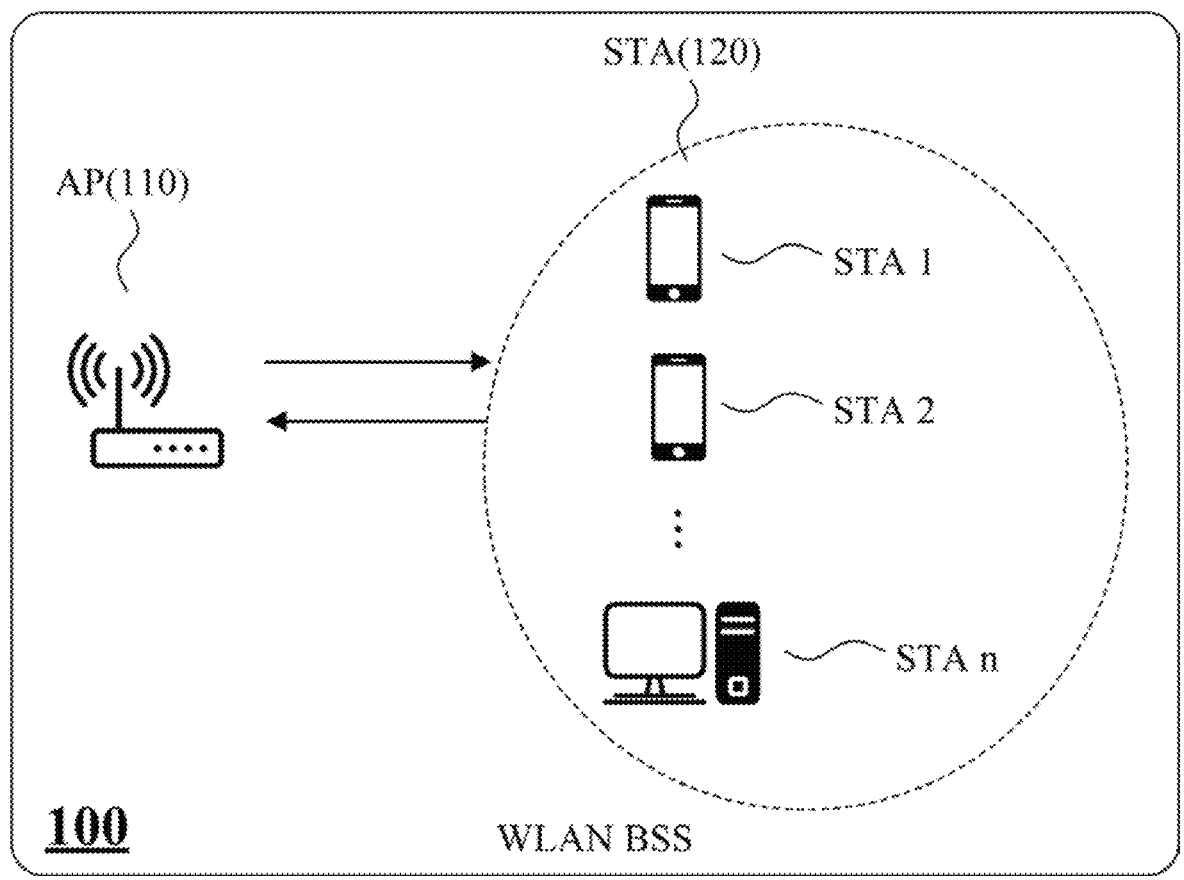
FIG. 1 illustrates an example basic service set in a wireless local area network (WLAN).

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

The following description applies to a wireless local area network (WLAN). The following description may apply to the next generation WLAN method (IEEE 802.11ax) or the like. The IEEE 802.11ax maintains compatibility with the conventional IEEE 802.11a/b/g/n/ac. The following description may be performed in an IEEE 802.11ax environment, and also maintains compatibility with the conventional IEEE 802.11a/b/g/n/ac.

The following description relates to in-band full-duplex communication. The following description may basically apply to the IEEE 802.11ax. However, the following description does not necessarily limitedly apply to the IEEE 802.11ax. Therefore, the following description may apply to WLAN standards that will emerge after the IEEE 802.11ax.

Terms used herein will be defined.

A WLAN or a next generation WLAN basically refers to a communication network operating according to a protocol defined in the IEEE 802.11ax. A conventional WLAN refers to a WLAN according to a standard prior to the IEEE 802.11ax.

An access point (AP) is an apparatus that provides access to the distribution system services and mostly is connected to the Internet to provide a wireless channel in a certain coverage area. The apparatus is hereinafter referred to as an AP.

A non-AP station (STA) is an apparatus that communicates the information through a certain wireless channel allocated by an AP. The apparatus is hereinafter referred to as an STA.

A station is used to mean either or both of an AP and an STA.

A signal transmitted by an AP to an STA is called a downlink signal. The downlink signal may be composed of at least one frame. The frame included in the downlink signal is called a downlink frame.

A signal transmitted by an STA to an AP is called an uplink signal. The uplink signal may be composed of at least one frame. The frame included in the uplink signal is called an uplink frame.

A target wake time (TWT) indicates a kind of various power saving modes defined in WLAN standard. An apparatus for requesting a TWT is referred to as a TWT requesting STA. An apparatus for responding to a TWT request is referred to as a TWT responding STA.

The full-duplex communication basically refers to in-band full-duplex transmission and reception concurrently using the same channel.

The IEEE 802.11ax is well known as High Efficiency WLAN (HE WLAN). A Physical Protocol Data Unit (PPDU) is newly defined in the IEEE 802.11ax PHY. Examples of the PHY PPDU for data transmission include High Efficiency Single User Physical Protocol Data Unit (HE SU PPDU), High Efficiency Multi User Physical Protocol Data Unit (HE MU PPDU), High Efficiency extended range Single User Physical Protocol Data Unit (HE ER SU PPDU) and High Efficiency Trigger Based Physical Protocol Data Unit (HE TB PPDU).

First, the WLAN and the IEEE 802.11ax will be described briefly below.

FIG. 1 illustrates an example basic service set (BSS) in a wireless location area network (WLAN). A BSS may include one AP and at least one STA. FIG. 1 illustrates a WLAN BSS 100 composed of a single AP 110 and a plurality of STAs 120, as an example. For convenience of description, it is assumed that a single BSS includes a plurality of STAs. Any one of the plurality of STAs 120 receives resources allocated for wireless communication and communicates with the AP 110. The AP 110 delivers information regarding the resource allocation to the STA.

Figure 2:
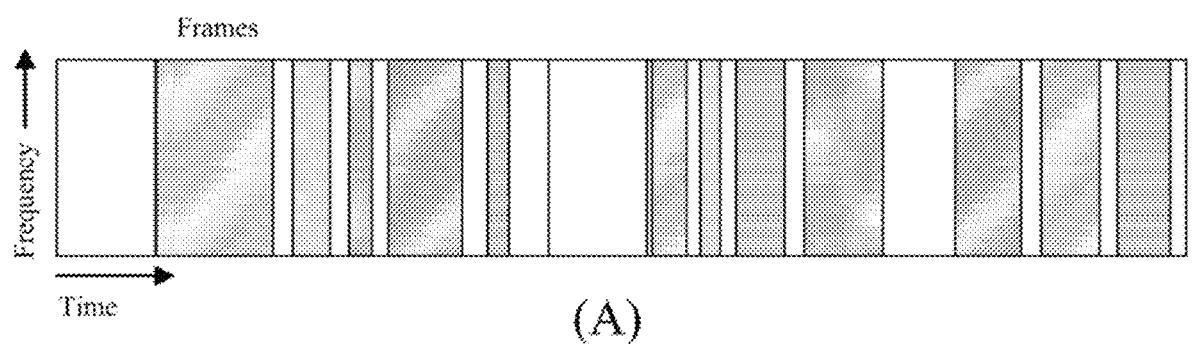
FIG. 2 illustrates example resources used for WLAN communication.
Figure 2:
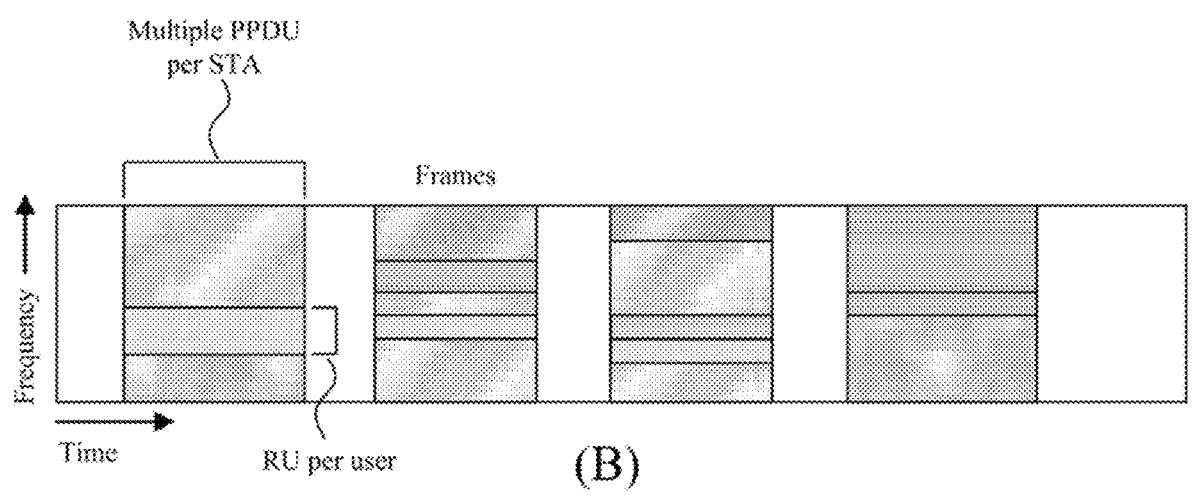

FIG. 2 illustrates example resources used for WLAN communication. In FIG. 2, one rectangular block refers to a resource allocated to one STA.

FIG. 2A illustrates example Orthogonal Frequency Division Multiple (OFDM) used in the conventional IEEE 802.11. A conventional WLAN has a frame exchange performed in Time Division Multiple Access (TDMA). STAs share any one wireless frequency channel in ISM band. Only one user (STA) occupies a specific channel in a specific time period.

FIG. 2B illustrates Orthogonal Frequency Division Multiple Access (OFDMA) modulation technology was employed newly in the IEEE 802.11ax. In OFDMA, one wireless channel can be composed of one or multiple resource units and the IEEE 802.11ax defines RU as a minimum allocation unit which is a group of subcarriers. The OFDMA enables multi-user transmission using frequency orthogonal division in the same time period. Any one user (STA) may use one RU in a specific time period. The AP may allocate different RUs to one or a plurality of STAs in a WLAN packet. Alternatively, the AP may separate spatial streams in a specific RU to allocate resources to any one or a plurality of STAs. The OFDMA provides more dynamic resource allocation to multiple users than the OFDM.

Figure 3:
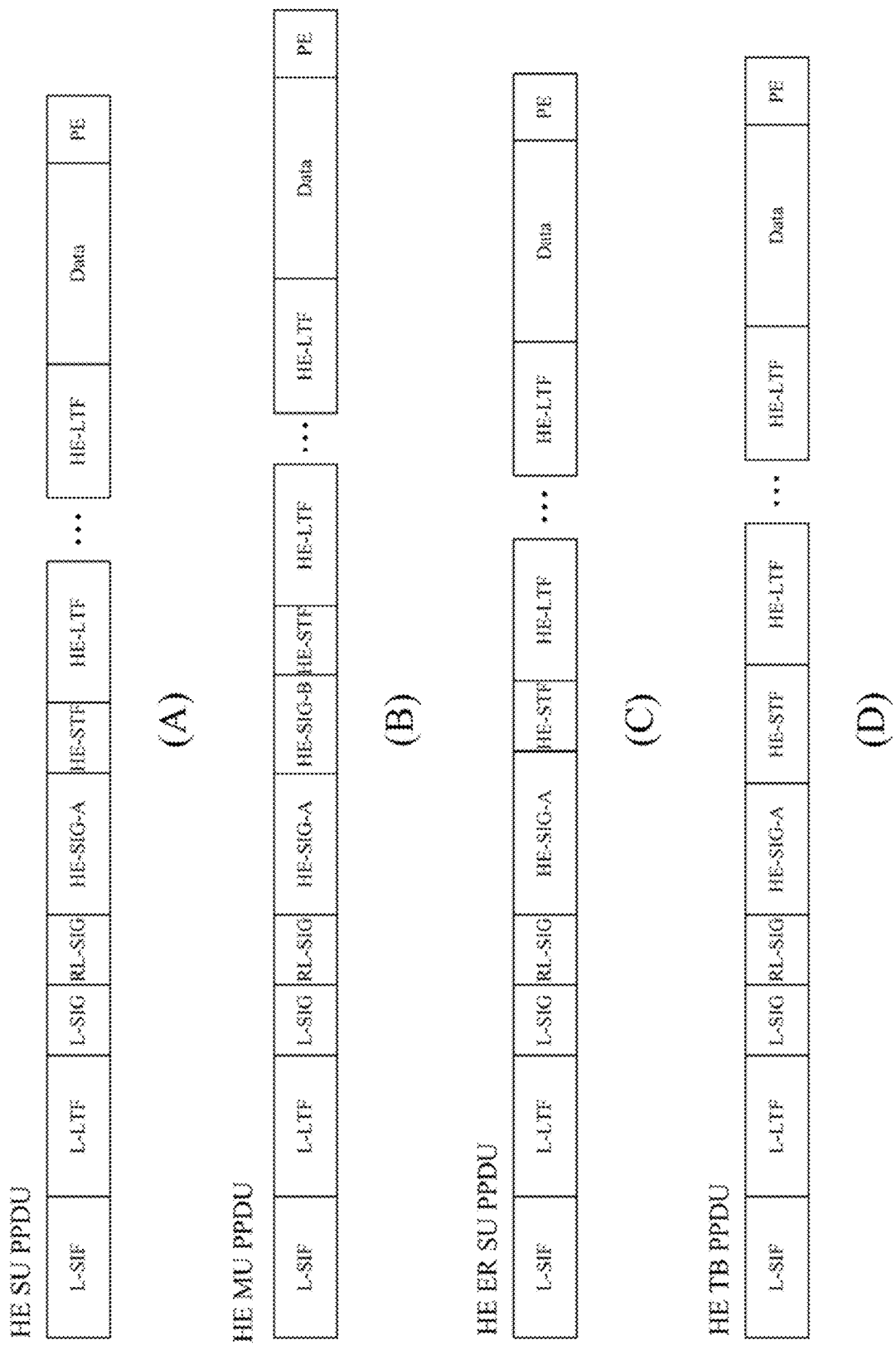
FIG. 3 illustrates an example PHY PPDU packet format defined in 802.11ax.

FIG. 3 illustrates an example PHY PPDU packet format defined in 802.11ax. The PPDUs in FIG. 3 are as follows: HE SU PPDU; HE MU PPDU; HE ER SU PPDU; and HE TB PPDU. The formats are shown in FIG. 3. Details of fields constituting each of the formats shown in FIG. 3 are shown in Table 1 below. Detailed descriptions of the fields will be omitted. The HE TB PPDU will be described below with FIG. 8.

TABLE 1

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAL field |
| HE-SIG-A | HE SIGNAL A field |
| HE-SIG-B | HE SIGNAL B field |
| HE-STF | HE Short Training field |
| HE-LTF | HE Long Training field |

TABLE 1-continued

| Field | Description |
| --- | --- |
| Data | The Data field carrying the PSDU(s) |
| PE | Packet |

Figure 4:
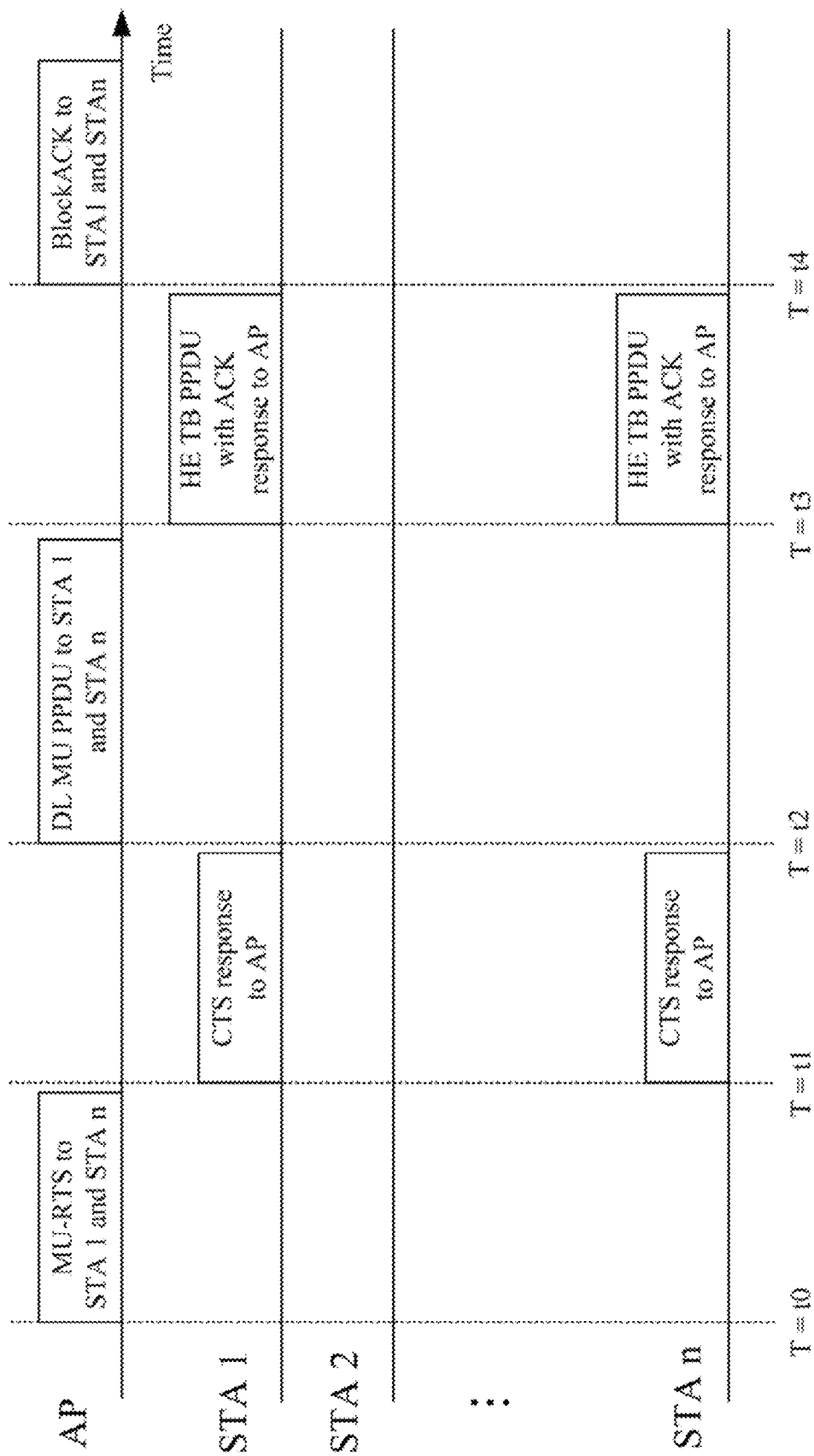
FIG. 4 illustrates an example communication process between an AP and an STA in 802.11ax.

FIG. 4 illustrates an example communication process between an AP and multiple STAs in 802.11ax. FIG. 4 illustrates an example communication process in a BSS in which there are a single AP and 'n' number of STAs. This example will be described in time order. FIG. 4 describes a multi-user (MU) scenario as an example.

The AP transmits a Multi-User Request-to-Send (MU-RTS) frame to STA 1 and STA n at time T=t0. In response to the MU-RTS frame, STA 1 and STA n commence a Clear-to-Send (CTS) frame at time T=t1. After receiving the CTS response successfully, the AP can perform the following steps. The MU-RTS/CTS exchange corresponds to a pre-operation for WLAN data transmission. This process is optional, and thus may not be an operation that must be performed before a DL MU PPDU.

The AP transmits a frame including resource allocation information to solicited STAs. The AP transmits a DL MU PPDU to solicited STAs, herein, STA1 and STA n at time T=t2. The DL MU PPDU may include a trigger frame or the DL MU PPDU may include a triggered response scheduling (TRS) control field. In response to the DL MU PPDU, STA 1 and STA n transmit an HE TB PPDU to the AP at time T=t3 as a response frame along with an ACK. The solicited STAs transmit the HE TB PPDU using allocated RUs respectively.

The AP may transmit a BlockAck frame in response to the reception of the HE TB PPDU. The kind of transmission of the BlockAck frame may be optional.

By repeating the above communication process, the AP communicates with a plurality of STAs.

The TWT power saving mode (PS or PS mode) will be described. The IEEE 802.11 working group has developed a TWT operation as one of WLAN power saving modes at 802.11ah standardization. When a BSS is dense with plenty of STAs, the STAs may consume unnecessary power due to transmission attempts and failures. A TWT is for the AP to schedule an operation period for the plurality of STAs in order to efficiently manage a network access. The AP may schedule an operation period for any one STA or a group of STAs according to a certain rule. The STA operation period corresponding to the TWT operation is referred to as a TWT service period (SP). The TWT discussed in 802.11ax will be described. In 802.11ax, the TWT has two types. One type is Individual TWT agreements between an AP and an STA, and the other type is a Broadcast TWT with no TWT agreement.

The TWT may be started at the request of the STA. For example, an STA such as a mobile terminal, an IoT device, and the like may request a TWT for power saving. In some cases, the AP may request a TWT operation from the STA.

Figure 5:
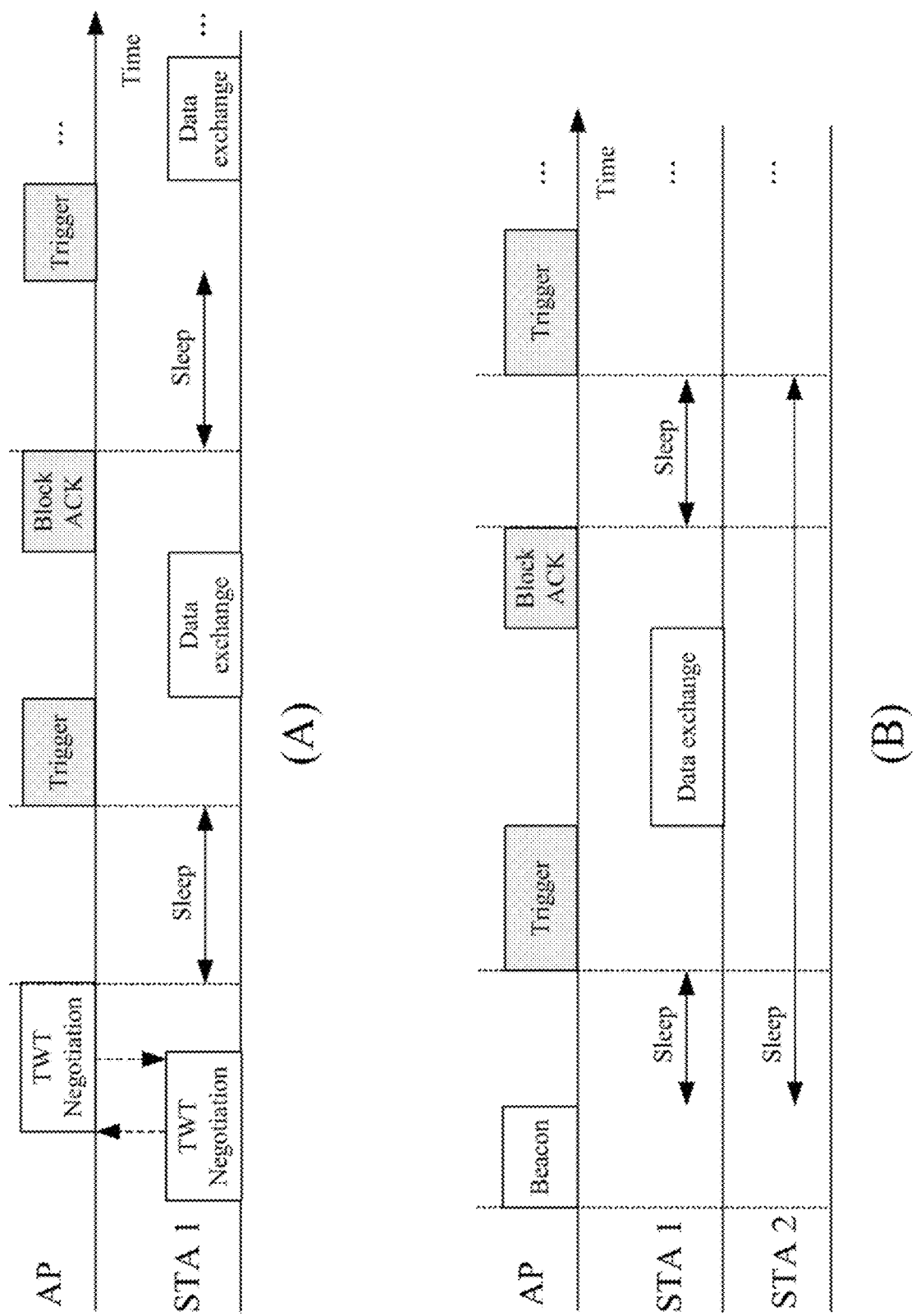
FIG. 5 illustrates an example target wake time (TWT) operation.

FIG. 5 illustrates an example TWT operation. For convenience of description, it is assumed that STA 1 is a TWT requesting station and an AP is a TWT responding station. FIG. 5A illustrates an example Individual TWT agreements. The example is about an operation between a single AP and a single STA (STA 1). STA 1 and the AP perform Individual TWT agreements. During negotiation, the AP and STA 1 exchange information regarding a TWT SP. That is, the AP and STA 1 may share any one of an initial sleep time and a wakeup start time while performing the negotiation. The AP and STA 1 may share a listen mode start time depending on a PS mode type. Subsequently, after a sleep time, STA 1 receives a trigger frame from the AP and performs an operation of exchanging data. When the TWT SP ends, STA 1 re-enters a sleep mode. The next TWT SP may be determined in advance while Individual TWT agreements are being performed. Alternatively, the next TWT SP may be determined through an information exchange during the previous TWT SP.

FIG. 5B illustrates an example Broadcast TWT. The example is about an operation between a single AP and two STAs (STA 1 and STA 2). In Broadcast TWT, A TWT scheduling AP may start with no request received and any associated STA may request and negotiate TWT parameters such as listen interval in advance. When the broadcast mode is entered, the STAs wait for a beacon signal sent by the AP. The AP may broadcast the entire SP during which the broadcast mode will proceed to the STAs by means of a beacon. The STA receives a beacon including a broadcast TWT element (TWT IE). When the information regarding STA 1 is found in the broadcast TWT element, STA 1 wakes up at a certain time and waits for a trigger frame. The AP may deliver a start time of the trigger frame to STA 1 through the broadcast TWT element. In this case, STA 1 wakes up before a designated start time of the trigger frame. The STA continuously maintains the sleep mode while there is no beacon signal or when a received beacon signal does not include wake-up information regarding the STA. STA 2 continuously maintains the sleep mode because information regarding STA 2 is not included in an first beacon signal. The TWT IE may include information regarding a TWT SP time. The TWT IE may include information indicating a wake-up time, a sleep time, an interval between sleep times, or the like.

The STA exchanges data with the AP in the pre-scheduled TWT SP. The AP and the STA may perform full-duplex communication in the TWT SP. It is assumed that an AP and STA which will be described below support 802.11ax by default. Full-duplex communication applicable to a WLAN environment such as 802.11ax will be described below. The full-duplex communication that will be described below may be performed in the TWT SP.

Figure 6:
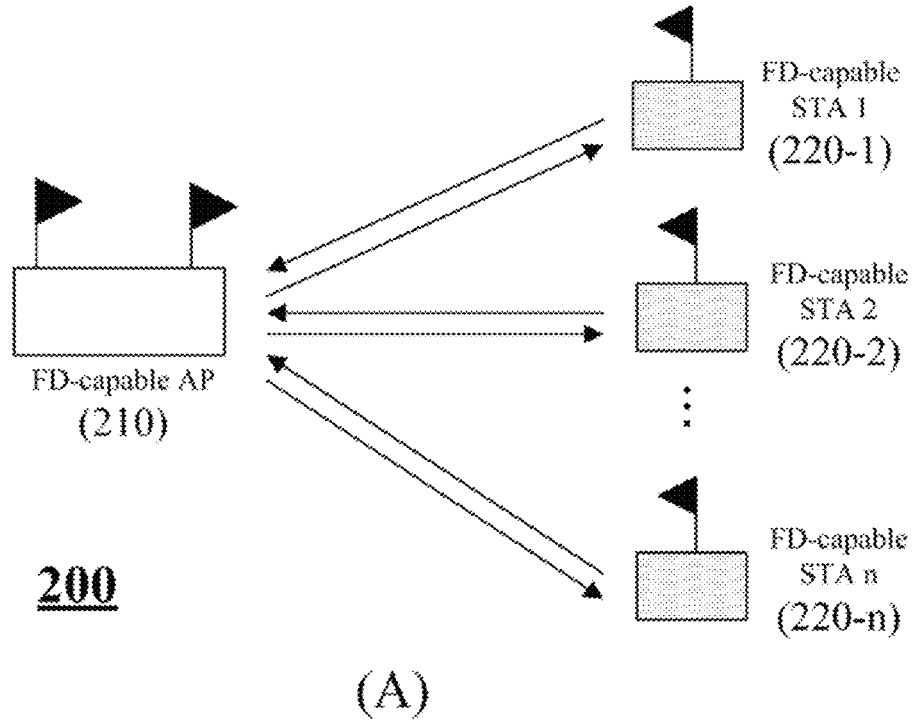
FIG. 6 illustrates an example process of performing full-duplex communication in a WLAN.
Figure 6:
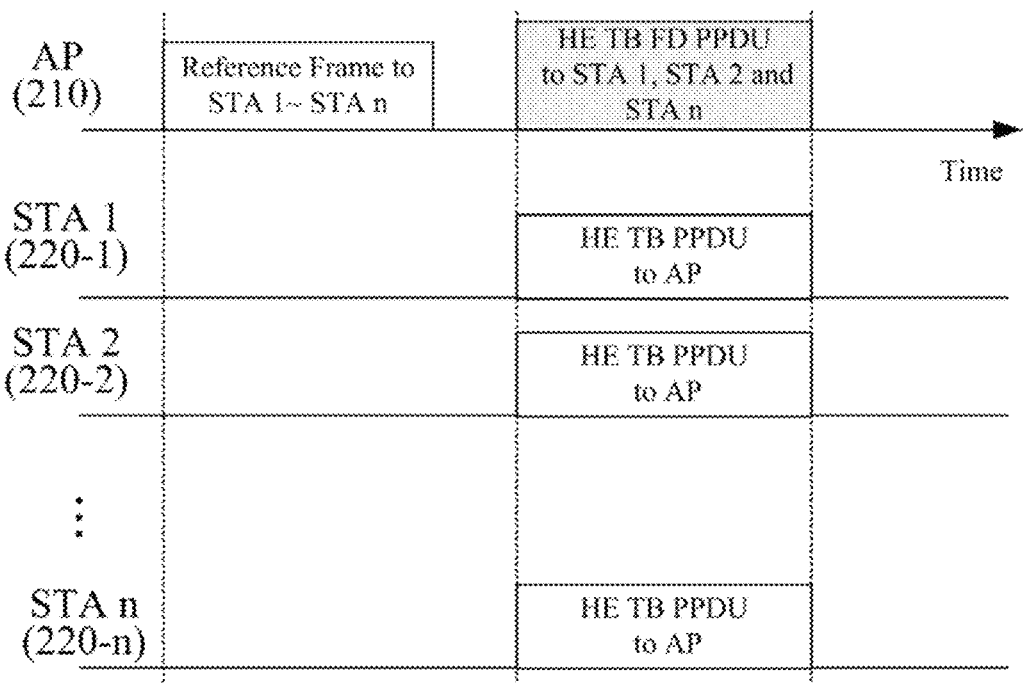

FIG. 6 illustrates an example process of performing full-duplex communication in a WLAN. FIG. 6A illustrates a BSS 200 that performs full-duplex communication in a WLAN. The BSS 200 includes a single AP 210 and 'n' number of STAs 220-1, 220-2, . . . , 220-n. The AP 210 is an AP capable of full-duplex communication (hereinafter referred to as an FD-capable AP). STA 1 220-1, STA 2 220-2, and STA n 220-n are STAs capable of full-duplex communication (hereinafter referred to as FD-capable STAs). The FD-capable AP or FD-capable STA has a function of canceling self-interference (SI) caused by a signal transmitted by the AP or STA themselves. An SI cancellation algorithm or apparatus may be implemented in various forms.

FIG. 6B illustrates an example in which full-duplex communication is performed in the BSS 200. This example will be described in time order. The AP 210 transmits a reference frame to STA 1 220-1, STA 2 220-2, and STA n 220-n. The reference frame may be the above-described trigger frame or the reference frame may include a TRS control field. The reference frame may include RU allocation information for OFDMA communication.

When the reference frame is received, STA 1 220-1, STA 2 220-2, and STA n 220-n transmit an HE TB PPDU through allocated RUs. STA 1 220-1, STA 2 220-2, and STA n 220-n may transmit the HE TB PPDU at a certain timing on the basis of the received reference frame. That is, STA 1 220-1, STA 2 220-2, and STA n 220-n may synchronize frames to be transmitted by using the received reference frame.

Meanwhile, the AP 210 may transmit a certain frame to STA 1 220-1, STA 2 220-2, and STA n 220-n at or within the same time period in which STA 1 220-1, STA 2 220-2, and STA n 220-n transmit the HE TB PPDU. The frame transmitted from the AP 210 is represented as an HE TB FD PPDU. That is, in the same time period, the AP 210 transmits a frame to STA 1 220-1, STA 2 220-2, and STA n 220-n while receiving frames from STA 1 220-1, STA 2 220-2, and STA n 220-n (full-duplex communication). The AP 210 performs synchronization with uplink transmission and then performs downlink transmission. The AP 210 may transmit an HE TB FD PPDU on the basis of the reference frame transmitted by the AP 210 or on the basis of timing information included in the reference frame.

Figure 7:
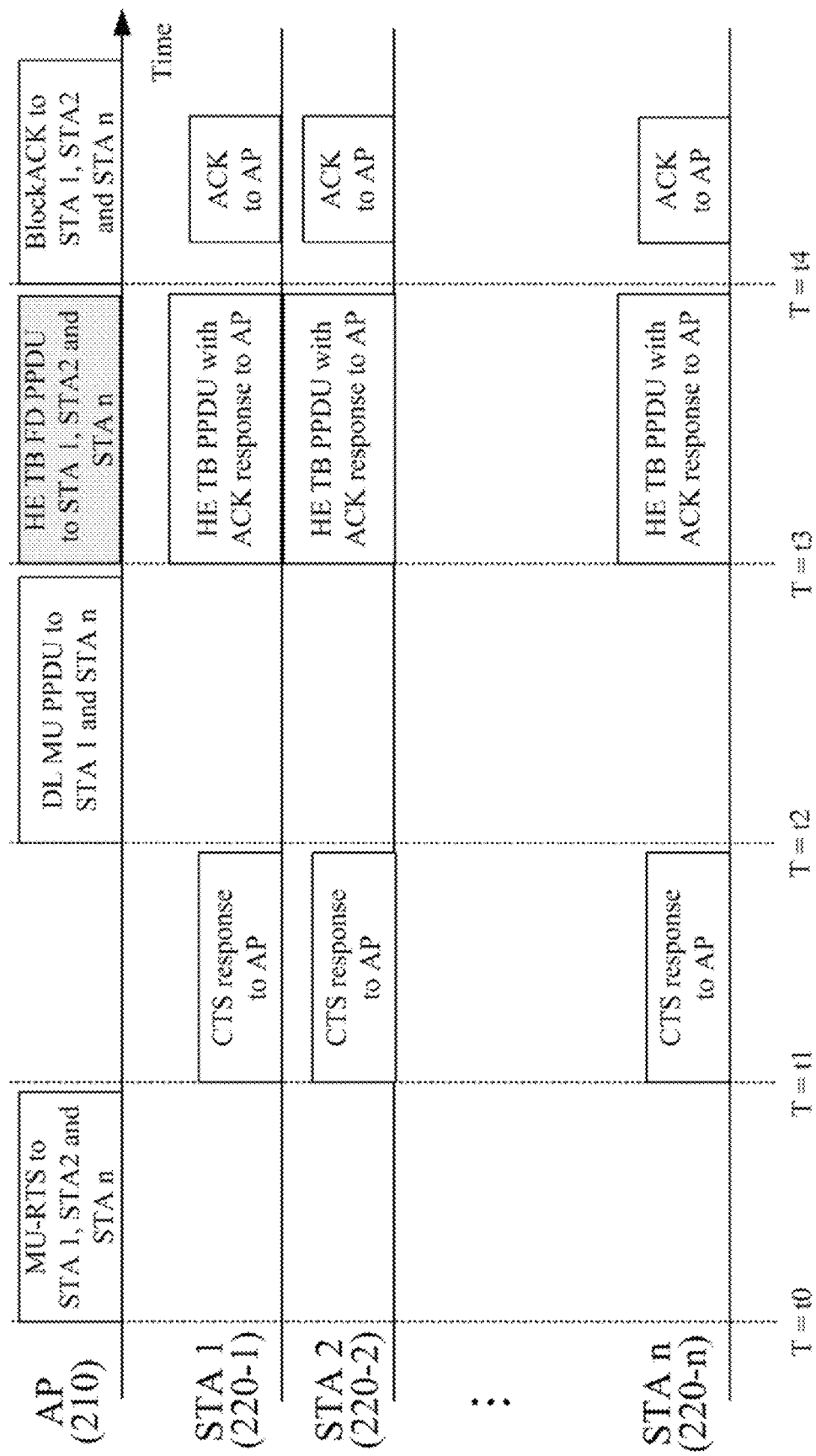
FIG. 7 illustrates another example process of performing full-duplex communication in a WLAN.

FIG. 7 illustrates another example process of performing full-duplex communication in a WLAN environment. FIG. 7 may be an example of a process of the BSS in FIG. 6A. This example will be described in time order.

The AP 210 transmits an MU-RTS frame to STA 1 220-1, STA 2 220-2, and STA n 220-n at time T=0. In response to the MU-RTS frame, STA 1 220-1, STA 2 220-2, and STA n 220-n transmit a CTS frame at time T=t1. After receiving the CTS response successfully, the AP can perform the following steps. The MU-RTS/CTS exchange corresponds to a pre-operation for data transmission. This process is optional, and thus may not be an operation that must be performed before the DL MU PPDU.

The AP 210 transmits the DL MU PPDU to STA 1 220-1, STA 2 220-2, and STA n 220-n at time T=t2. The DL MU PPDU corresponds to the above-described reference frame. The DL MU PPDU may include a TRS control field. The DL MU PPDU may include RU allocation information for STAs.

When the reference frame is received, STA 1 220-1, STA 2 220-2, and STA n 220-n may transmit an HE TB PPDU through allocated RUs along with an ACK at time T=t3. STA 1 220-1, STA 2 220-2, and STA n 220-n may transmit the HE TB PPDU to the AP in the same time period. STA 1 220-1, STA 2 220-2, and STA n 220-n may transmit the HE TB PPDU at a certain timing which is the SIFS time boundary, after the end of a received reference frame. That is, STA 1 220-1, STA 2 220-2, and STA n 220-n may synchronize frames to be transmitted by using the received DL MU PPDU. A SIFS is the time from the end of the last symbol, or signal extension if present, of the previous frame to the beginning of the first symbol of the preamble of the subsequent frame. For example, if the control frame is a response frame of a previous frame, the WLAN device transmits the control frame without performing backoff if a SIFS has elapsed.

Meanwhile, the AP 210 may transmit an HE TB FD PPDU to STA 1 220-1, STA 2 220-2, and STA n 220-n at time T=t3. That is, the AP 210 transmits a downlink frame while receiving uplink frames from STA 1 220-1, STA 2 200-2, and STA n 220-n in the same time period (full-duplex communication). The AP 210 transmits the HE TB FD PPDU on the basis of the DL MU PPDU transmitted by the AP 210 or on the basis of timing information included in the DL MU PPDU.

In response to the reception of the HE TB PPDU, the AP 210 may transmit a BlockAck frame to STA 1 220-1, STA 2 200-2, and STA n 220-n at time T=t4. The transmission of the BlockAck frame may be optional. Also, STA 1 220-1, STA 2 220-2, and STA n 220-n may transmit an ACK for the HE TB FD PPDU. The STA transmitting an ACK is optional.

Figure 8:
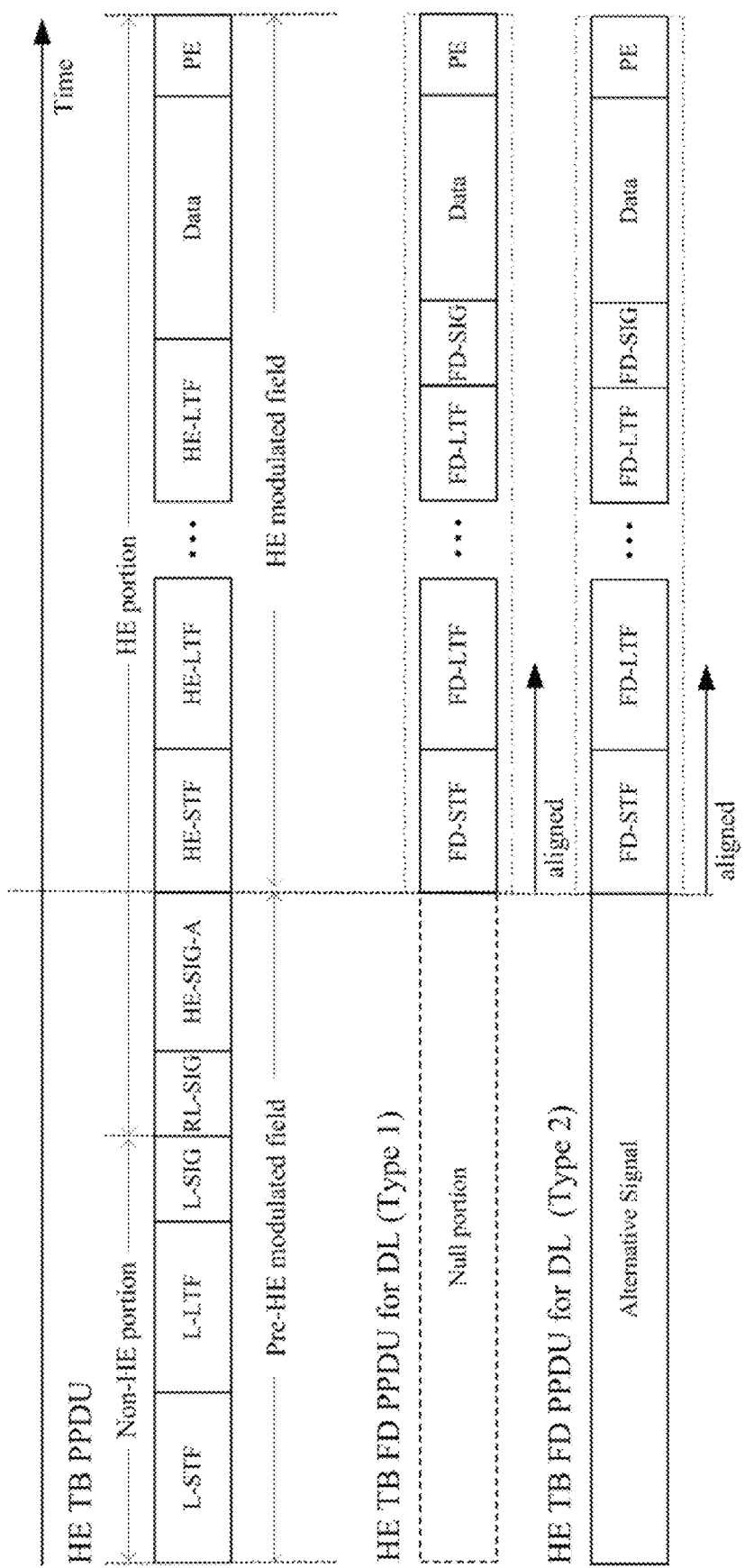
FIG. 8 illustrates an example packet for full-duplex communication.

FIG. 8 is an example packet for full-duplex communication. An example HE TB PPDU structure is shown in an upper portion of FIG. 8. An example HE TB FD PPDU structure is shown in a lower portion of FIG. 8. An example in which the HE TB PPDU and the HE TB FD PPDU are placed in the same time period is shown. FIG. 8 is an example in which HE TB PPDU (uplink) and HE TB FD PPDU (downlink) constituting full-duplex communication are placed in the same time period.

As described above, the HE TB PPDU may be transmitted in a certain time period on the basis of a reference frame (a trigger frame) received by an STA. In this case, the HE TB PPDU may be transmitted after a short IFS (SIFS) time interval from the reference frame.

The HE TB PPDU can be divided into a non-HE portion and an HE portion. The non-HE portion includes an L-short training field (STF), L-long training field (LTF), and L-signal information field (SIG). These fields are defined in a conventional WLAN standard. 802.11ax uses the same fields as described in the WLAN standard for the purpose of compatibility with conventional WLAN. The L-STF is a short training sequence and is used for packet detection and automatic gain adjustment (AGC). The L-LTF is a relatively long training sequence and is used for channel estimation. The L-SIG may include control information corresponding to decoding of PSDU or the like.

RL-SIG, in which a conventional legacy L-SIG is repeated, is a field for HE PPDU detection. HE-SIG-A includes MCS, a frequency band, the number of spatial streams (NSTS), and parameters for frame decoding. HE-STF and HE-LTF include a training sequence for multiple-input and multiple-output (MIMO). The HE-STF is mainly used to measure automatic gain adjustment during MIMO transmission. The HE-LTF is used to estimate a MIMO channel. The HE-LTF has a variable length. Data field includes an encoder/decoder scrambler and an encoded MAC frame. PE is the last extension field.

The HE TB PPDU can be divided into a pre-HE modulated field and an HE modulated field. HE PHY may support DFT periods of 3.2 μs and 12.8 μs for the pre-HE modulated field and the HE modulated field of the HE PPDU, respectively.

In the HE TB FD PPDU, a modulated signal may be transmitted in a region in which the HE modulated field of the HE TB PPDU is started in the same time period. In a period in which the pre-HE modulated field of the HE TB PPDU is transmitted, the HE TB FD PPDU may be null (Type 1). The HE TB FD PPDU may be aligned to the HE modulated field of the HE TB PPDU in the same time period. A null portion is a signal field in which no signal is transmitted. Also, the null portion may be a signal field for transmitting information that does not affect the processing of the HE TB PPDU by the AP. The AP transmits the HE TB FD PPDU in a time period that receives the HE TB PPDU, and intends to transmit the HE TB FD PPDU in a period that does not affect the processing of the received HE TB PPDU. That is, the AP controls a time to transmit the HE TB FD PPDU such that the transmission of the HE TB FD PPDU does not disturb the transmission of the HE TB PPDU. The AP ensures that the training process for the received HE TB PPDU is normally performed.

Meanwhile, the HE TB FD PPDU may transmit a certain signal in a period in which the pre-HE modulated field of the HE TB PPDU is transmitted. FIG. 8 illustrates a type having Alternative Signal field (Type 2), as an example. As described above, when both of the AP and the STA are capable of full-duplex communication, the AP and the STA may transmit signals concurrently In the same radio channel.

A lower portion of FIG. 8 illustrates an HE TB FD PPDU structure. The HE TB FD PPDU structure shown in FIG. 8 is an example, and the HE TB FD PPDU may have another structure. FIG. 8 illustrates an example including FD-STF, FD-LTF, FD-SIG, and the like. In this case, the fields may perform functions similar to those of the HE-STF, HE-LTF, and HE-SIG.

Figure 9:
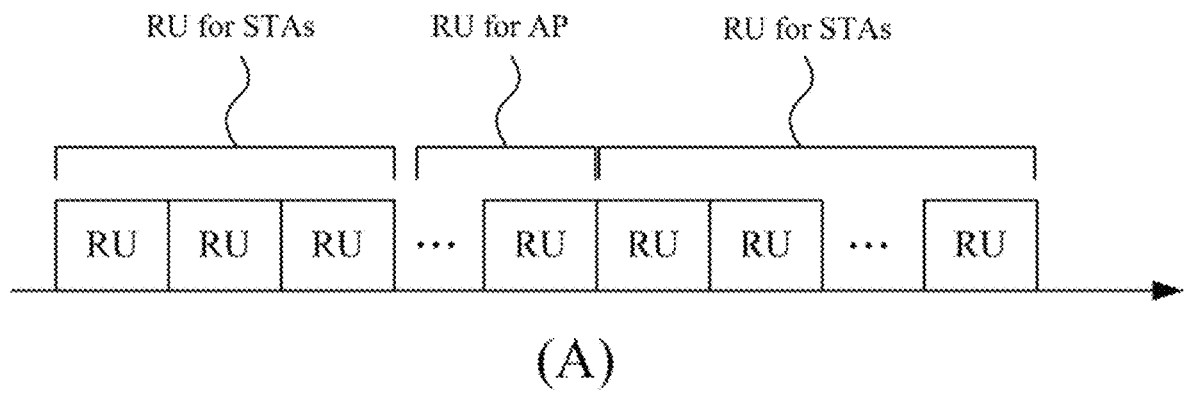
FIG. 9 illustrates example resources to be allocated for full-duplex communication.
Figure 9:
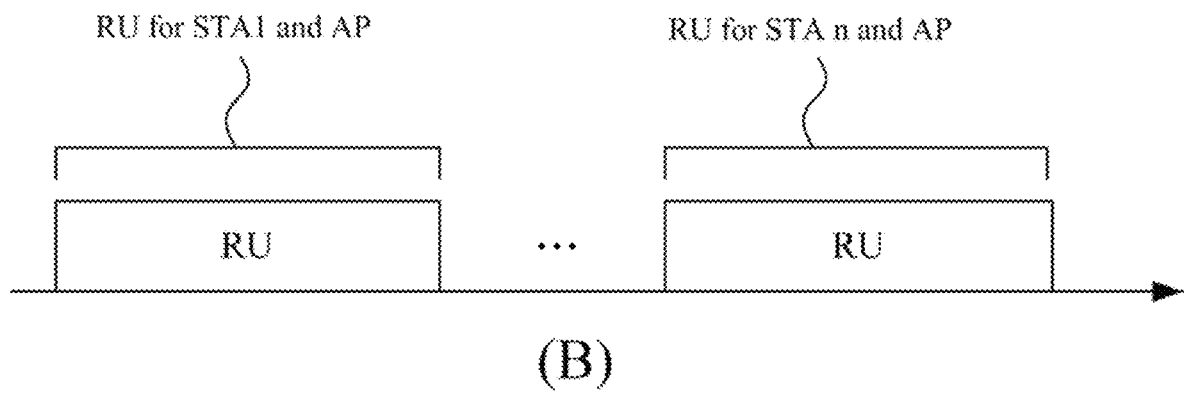

FIG. 9 illustrates example resources to be allocated for full-duplex communication. FIG. 9A illustrates an example in which individual RUs are allocated for uplink and downlink. When an FD-capable AP performs full-duplex communication with any STA, the AP and the STA may use different RUs. FIG. 9B illustrates a case in which a pair of AP and STA uses a single common RU. When an FD-capable AP and an FD-capable STA perform full-duplex communication, the pair may use a common RU. The AP may deliver information regarding the RU through the reference frame (the trigger frame). FIG. 9B illustrates an example in which the AP and STA 1 use a common RU and the AP and STA n use a common RU.

Figure 10:
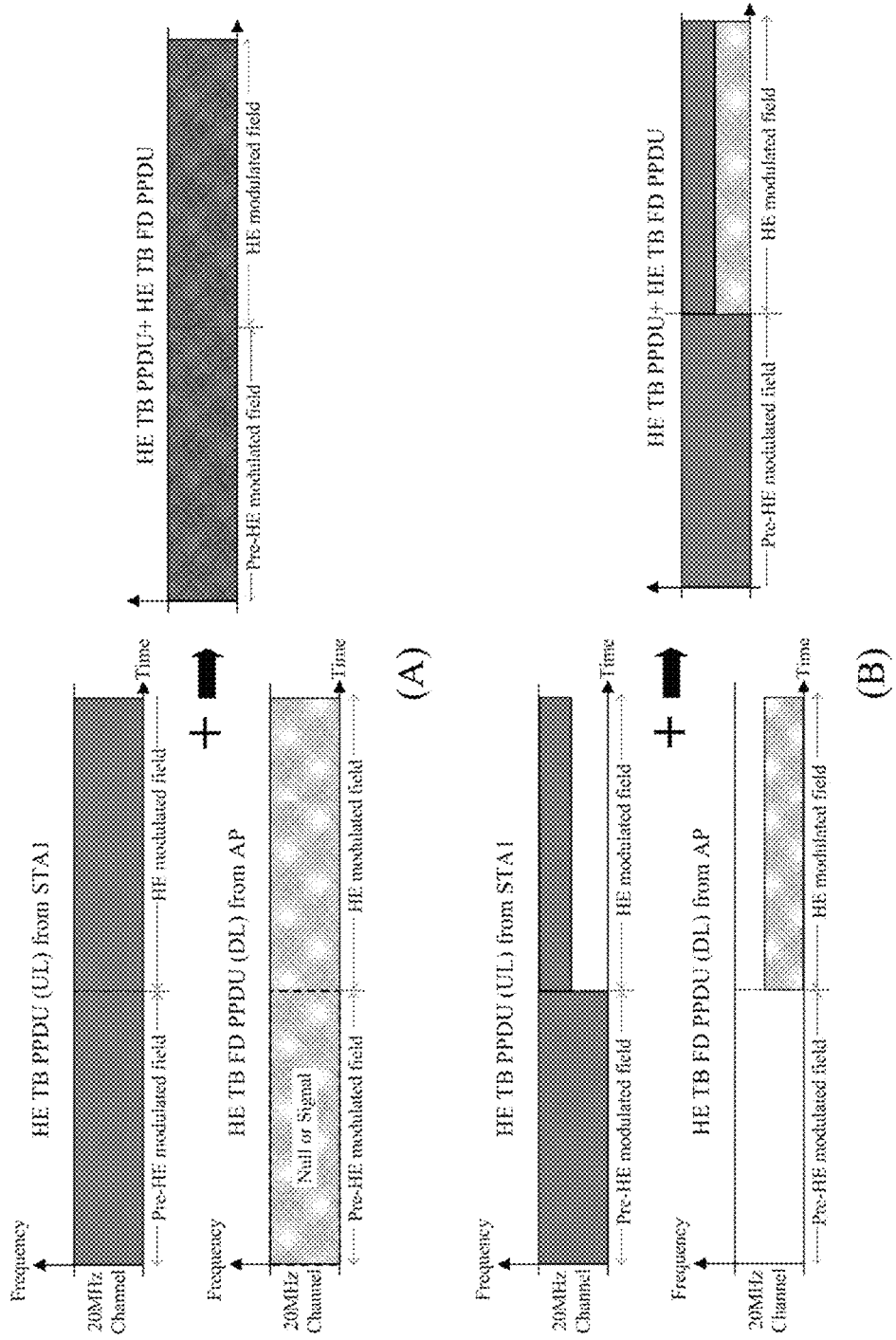
FIG. 10 illustrates example resource allocation for full-duplex communication.

FIG. 10 illustrates example resource allocation for full-duplex communication. FIG. 10 illustrates example resources allocated in the same time period. FIG. 10 illustrates example resource allocation for full-duplex communication between a single AP and a single STA (STA 1). Further, the AP may communicate with different STA(n) from STA 1 in the same time.

FIG. 10A illustrates an example in which the AP and STA 1 use the same RU. STA 1 transmits an HE TB PPDU using a 242-tone RU (20 MHz). At the same time, the AP transmits an HE TB FD PPDU using the same RU. In this case, the HE TB FD PPDU may have a null portion at a front part, as described above with reference to FIG. 8. The right side of FIG. 10A illustrates an example in which the HE TB PPDU and the HE TB FD PPDU are transmitted at the same time.

FIG. 10B illustrates an example in which the AP and STA 1 use different RUs. STA 1 transmits the HE TB PPDU using one RU among 26-tone RU (about 2 MHz), 52-tone RU (about 4 MHz), and 104-tone RU (about 10 MHz) within 20 MHz. In this case, the pre-HE modulated field may be transmitted using a 20 MHz channel including a corresponding RU (or 40 MHz including adjacent 20 MHz), and the HE modulated field may be transmitted using an allocated RU. At the same time, the HE TB FD PPDU is transmitted through another RU (26/52/104-tone RU) that is not allocated within 20 MHz. The right side of FIG. 10B illustrates an example in which the HE TB PPDU and the HE TB FD PPDU are transmitted at the same time.

Figure 11:
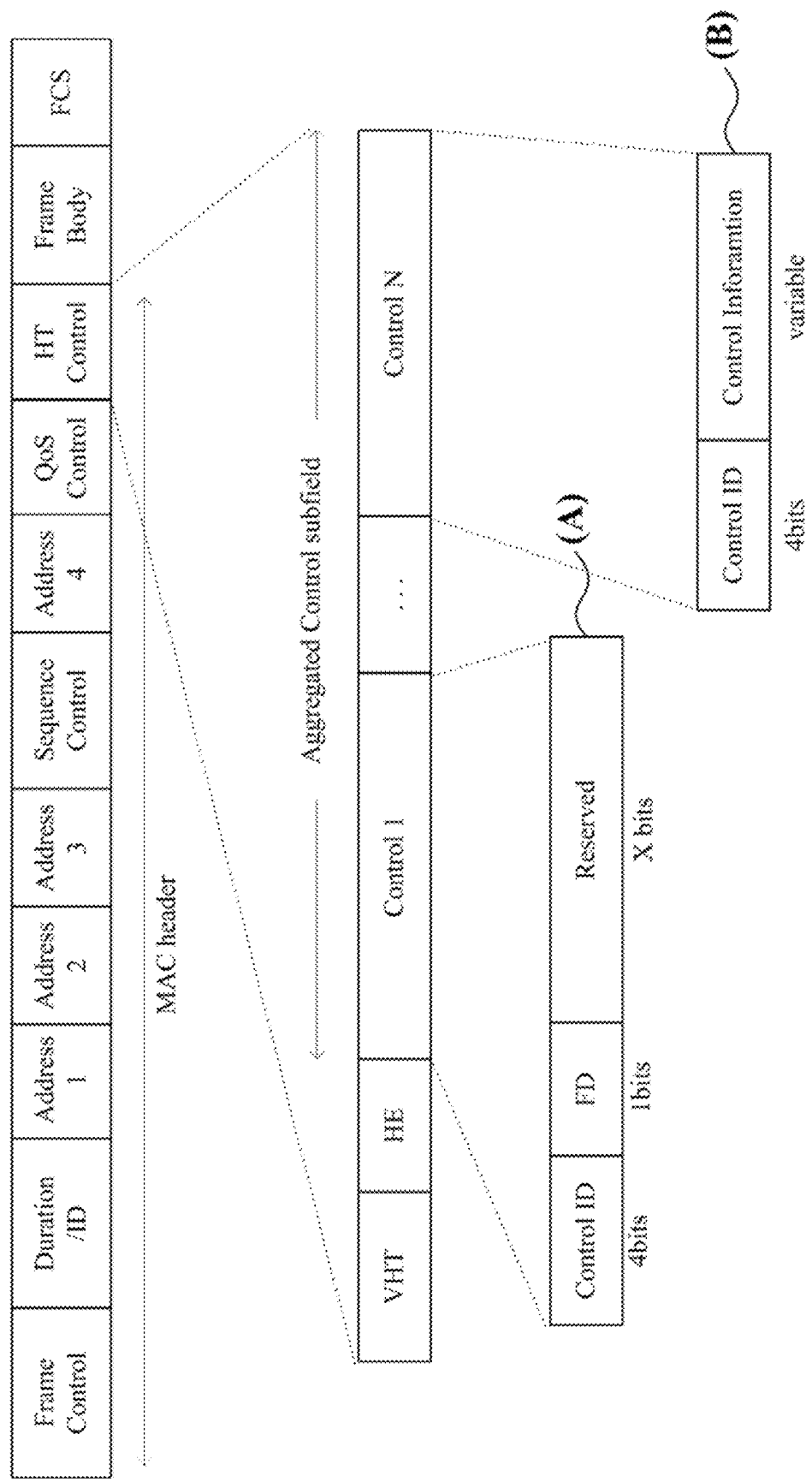
FIG. 11 illustrates an example reference frame.

FIG. 11 illustrates an example reference frame. The reference frame may be a trigger frame defined in IEEE 802.11ax. The reference frame may include information regarding RUs for full-duplex communication (FD). Resource allocation information for the FD communication may be implemented in various forms. FIG. 11 illustrates an example frame to be used in 802.11ax. A description of information included in a MAC header, that is, a description of the same part as a conventional WLAN header will be omitted.

HT Control field includes an aggregated control subfield. FIG. 11A indicates an example in which a field for FD resource information is separately added to the control subfield. FIG. 11A includes Control ID, FD, and Reserved field. Control ID is an identifier about information indicated by the control subfield. When Control ID is set to a value indicating the FD resource information, FD field may include resource information for the FD communication. FIG. 11B indicates another example control subfield. In FIG. 11B, when Control ID is set to a value indicating the FD resource information, the resource information for the FD communication may be included in Control Information field. Alternatively, when Control ID is set to a specific value to which a current use is not allocated, the resource information for the FD communication may be included in Control Information field.

FIG. 11 illustrates an example in which the FD resource information is delivered using HT Control field. In some cases, the reference frame may carry the FD resource information through another field or an FD-dedicated field.

Figure 12:
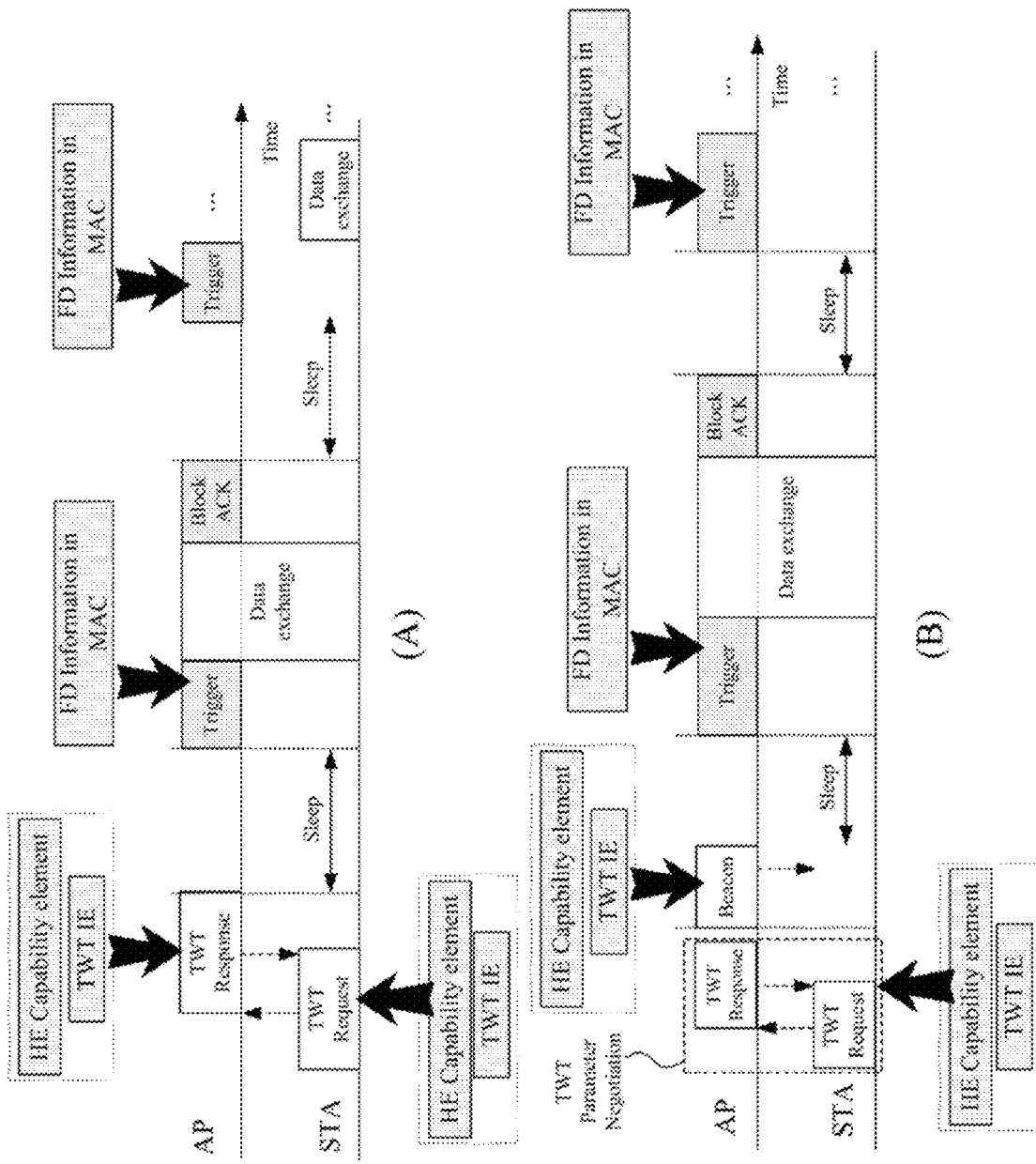
FIG. 12 illustrates an example process of performing full-duplex communication at a TWT.

FIG. 12 illustrates an example process of performing full-duplex communication during TWT SP. For convenience of description, FIG. 12 will be described on the basis of a single AP and a single STA.

FIG. 12A illustrates Individual TWT agreements, as an example. As an example, the STA is a TWT requesting station, and the AP is a TWT responding station. The STA and the AP perform Individual TWT agreements. (1) The STA transmits a TWT request frame. The TWT request frame may include an HE capability element. The STA may notify the AP of its full-duplex communication capability through the HE capability element. The HE capability element will be described below. The AP may check the full-duplex communication capability of the STA through the HE capability element transmitted by the STA. The TWT request frame may include a TWT IE. The STA may notify the AP of information regarding primary channel candidates to be used in the TWT SP through the TWT IE. The TWT IE will be described below. (2) The AP transmits a TWT response frame to the STA. The TWT response frame may include an HE capability element. The AP may notify the STA of its full-duplex communication capability through the HE capability element. The TWT request frame may include a TWT IE. The AP may notify the STA of information regarding temporary primary channel during the TWT SP through the TWT IE.

According to Individual TWT agreements, the STA operates in the sleep mode for a certain time. the STA wakes up at a specific time accordingly. The AP transmits a trigger frame to the STA. The trigger frame may include RU allocation information for a data exchange during the TWT SP. The AP transmits RU allocation information to solicited STAs through the trigger frame. (1) RU allocation information may be delivered through information of an MAC layer. For example, the RU allocation information may be delivered through the information (control field) of the MAC layer which has been described in FIG. 12. (2) In some cases, the RU allocation information for the TWT SP may be delivered through a separate information element such as the TWT IE.

During the TWT SP, the AP and the STA exchange certain data. In this case, the AP and the STA may perform full-duplex communication. In this case, the HE TB FD PPDU transmitted by the AP may be transmitted in a time period of the HE modulated field of the HE TB PPDU (STA).

When the TWT SP ends, the STA re-enters the sleep mode. (1) In the TWT SP, the AP may re-transmit the trigger frame to allocate an RU to the STA. (2) In some cases, the AP may exchange data with the STA not by allocating a separate RU but by using the RU that has been used in the previous TWT SP.

FIG. 12B illustrates Broadcast TWT. The STA may negotiate TWT parameters with AP in Broadcast TWT. For example, the STA may request TWT parameter through a TWT request frame to the AP. And the STA may receive TWT parameter such as a listening interval from the AP through TWT response frame in advance.

The TWT request frame may include an HE capability element. The STA may notify the AP of its full-duplex communication capability through the HE capability element. The TWT request frame may include a TWT IE. The STA may notify the AP of information regarding primary channel candidates that may be used in the TWT SP through the TWT IE.

The STAs wait for a beacon signal of the AP in Broadcast TWT. The AP may broadcast the entire SP during which the broadcast mode will proceed to the STAs by means of a beacon. In this case, the beacon may include an HE capability element. The AP may notify the STA of its full-duplex communication capability through the HE capability element. The beacon may include a TWT IE. The AP may notify the STA of information regarding temporary primary channel during the TWT SP through the TWT IE.

The STA receives the beacon including the TWT IE. When the STA finds information regarding the STA from the TWT IE, the STA wakes up at a certain time and waits for a trigger frame. The AP may deliver a start time of the trigger frame to the STA through the TWT IE. In this case, the STA wakes up before a designated start time of the trigger frame.

The AP transmits a trigger frame to solicited STAs. The trigger frame may include RU allocation information for a data exchange during the TWT SP. The AP transmits RU allocation information to solicited STAs through the trigger frame. (1) RU allocation information may be delivered through information of an MAC layer. For example, the RU allocation information may be delivered through the information (control field) of the MAC layer which has been described in FIG. 12. (2) In some cases, the RU allocation information for the TWT SP may be delivered through a separate information element such as the TWT IE.

During the TWT SP, the AP and the STA exchange certain data. In this case, the AP and the STA may perform full-duplex communication. In this case, the HE TB FD PPDU transmitted by the AP may be transmitted in a time period of the HE modulated field of the HE TB PPDU (STA).

When the TWT SP ends, the STA re-enters the sleep mode. (1) In the TWT SP, the AP may re-transmit the trigger frame to allocate an RU to the STA. (2) In some cases, the AP may exchange data with the STA not by allocating a separate RU but by using the RU that has been used in the previous TWT SP.

The TWT requesting station transmits a TWT request frame. In response to the transmitted TWT request frame, the TWT responding station transmits a TWT response frame. The TWT requesting station transmits information regarding temporary primary channel candidates to be used during the TWT SP. In this case, the TWT requesting station may use any subchannel in a operation channel bandwidth as the information regarding the temporary primary channel candidates.

Alternatively, the TWT requesting station may offer multiple candidates as temporary primary channel and the TWT responding station may determine one of those candidates as temporary primary channel.

Figure 13:
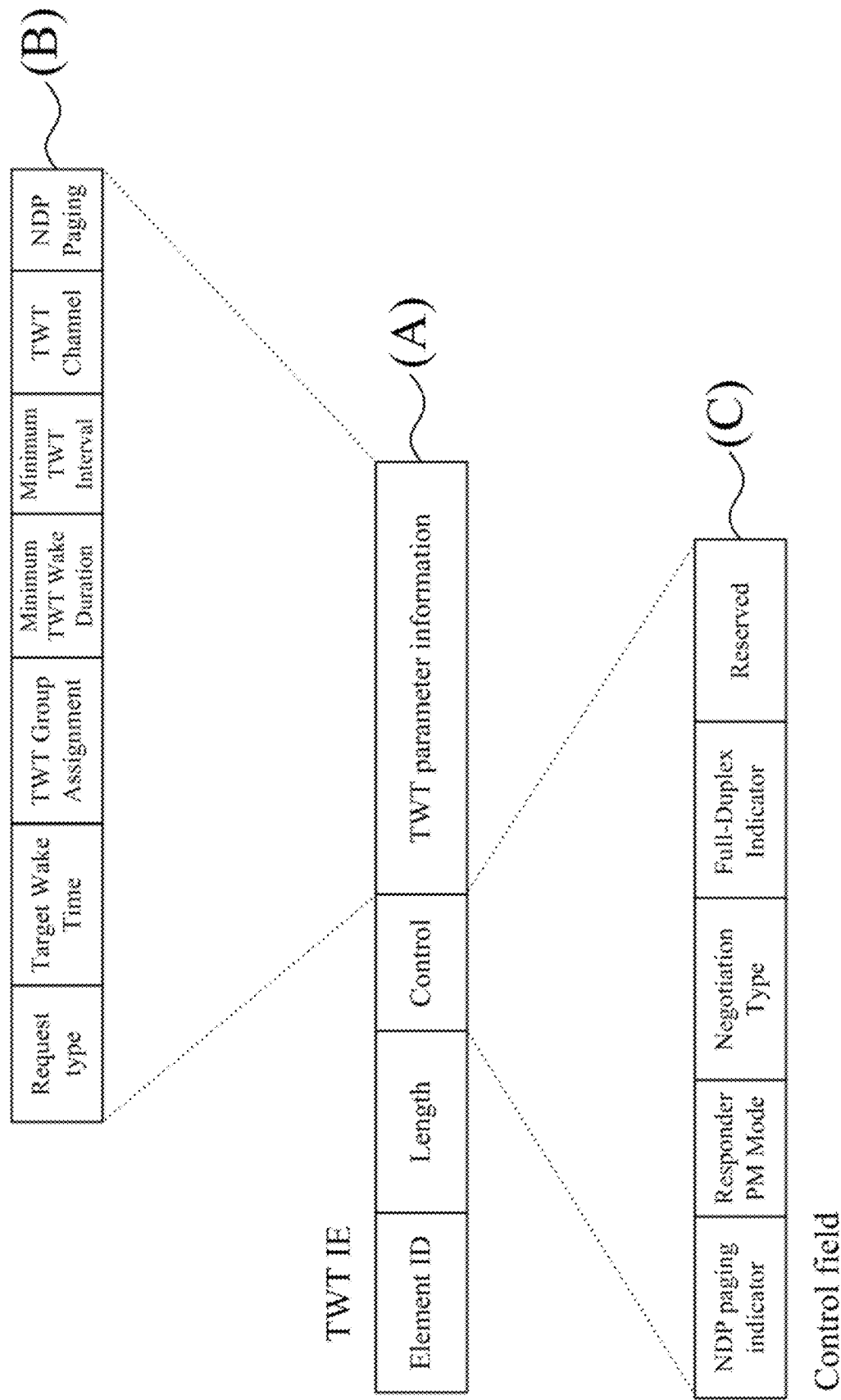
FIG. 13 illustrates an example TWT information element.

The TWT IE, which is used for an information exchange for the TWT operation, will be described. FIG. 13 illustrates an example of the TWT IE. In FIG. 13, the TWT IE includes a field for full-duplex communication. FIG. 13 is one example, and the TWT IE may have another structure.

FIG. 13A illustrates an example of the TWT IE. The TWT IE includes Element ID, Length, Control, and TWT parameter information fields. Element ID includes an identifier indicating the type of information. For example, the STA may identify that a corresponding sequence is the TWT IE by using a value of Element ID. Length is a field indicating length. Control field includes control information. TWT parameter information includes various parameter values for the TWT.

FIG. 13B illustrates an example of TWT parameter information. TWT parameter information may include various kinds of information for the TWT. TWT parameter information includes Request type, Target Wake Time, TWT Group Assignment, Minimum TWT Wake Duration, Minimum TWT Interval, TWT Channel, and NDP paging fields. FIG. 13B illustrates one example of TWT parameter information. TWT parameter information may further include another field or may have another configuration. Request type indicates an identifier for a specific TWT request. Although not shown in FIG. 13, Request type may be composed of a plurality of individual fields. Target Wake Time may indicate an initial TWT time or interval. Minimum TWT Wake Duration may indicate a minimum TWT SP time. Minimum TWT Interval may indicate a minimum interval between TWT SPs. TWT Channel may indicate channel information that is usable for the TWT SP.

TWT Group Assignment indicates an STA group allocating a TWT. TWT Group Assignment may also indicate STAs having full-duplex communication capability as one group.

The TWT channel will be described. The TWT requesting station may transmit bitmap information for temporary primary channel (TPCH) temporarily available during the TWT SP. The TWT responding station may transmit bitmap information for primary channels available during the TWT SP. In the bitmap, one bit may indicate a minimum width channel in a communication band. The minimum bandwidth channel may be 20 MHz. The TWT responding station finally determines a temporary primary channel to be used for the TWT SP. The temporary primary channel transmitted by the TWT responding station as a response is named TWT SP TPCH. The TWT Channel of FIG. 13B may indicate bitmap information for channels.

FIG. 13C illustrates an example of Control field. FIG. 13C includes NDP paging indicator, Responder PM Mode, Negotiation type, Full-Duplex Indicator, and Reserved fields. FIG. 13C is an example of Control field. Control field may further include another field or may have another configuration. The AP or STA may deliver, through Full-Duplex Indicator, a fact that full-duplex communication is performed or may be performed during the TWT SP.

In some cases, the AP may check full-duplex communication capability of a specific STA during a hand-shaking process or during an RTS/CTS exchange process. Alternatively, the AP may check, by using information included in a TWT request transmitted by the STA, that the corresponding STA is capable of full-duplex communication.

Figure 14:
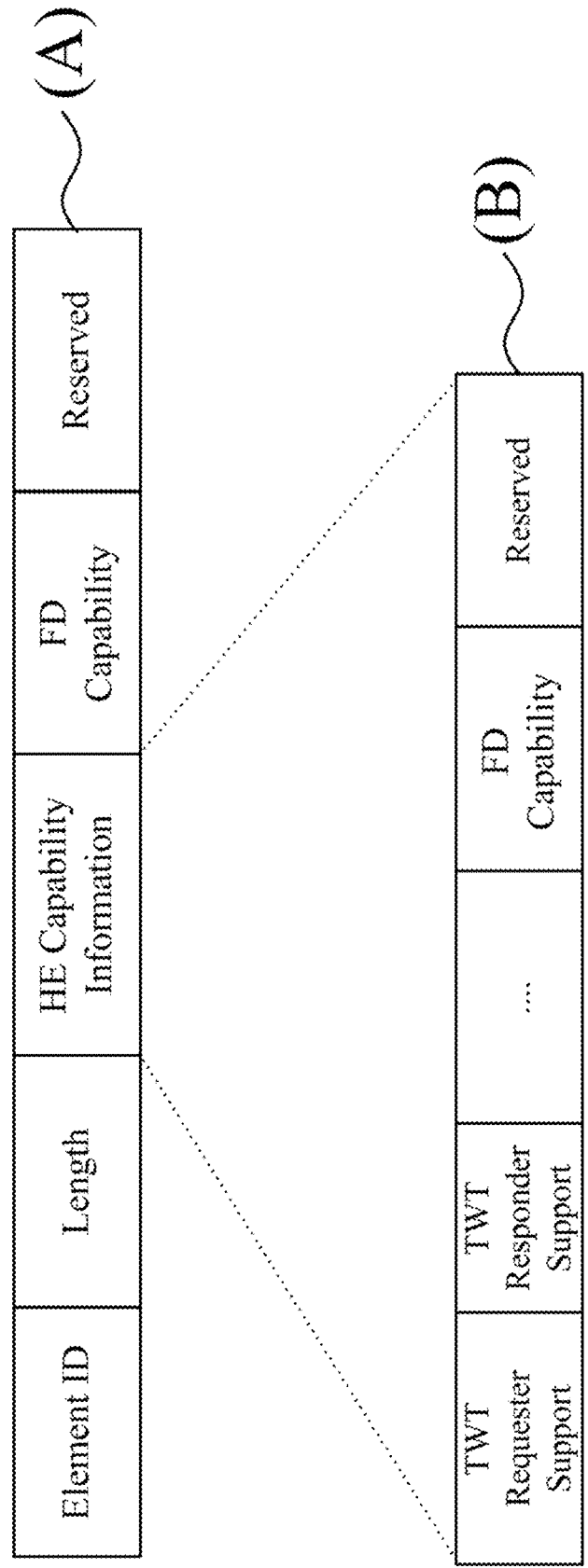
FIG. 14 illustrates an example HE capability element.

The AP or STA may notify another apparatus that the AP or STA supports an HE WLAN. For example, the AP or STA may deliver information regarding the HE WLAN using the HE capability element. FIG. 14 illustrates an example of the HE capability element.

FIG. 14A illustrates an example showing the HE capability element. The HE capability element includes Element ID, Length, HE Capability Information, and the like. Element ID may include an identifier indicating that corresponding information indicates an HE capability element. HE Capability Information may indicate that the AP or STA is an apparatus that supports an HE WLAN (802.11 ax or later versions). In FIG. 14A, the HE capability element includes FD Capability field. FD Capability is an indicator for full-duplex communication capability. For example, when FD Capability is 1, a corresponding apparatus may have full-duplex communication capability. FIG. 14A is an example in which a specific field of the HE capability element includes information regarding the full-duplex communication capability of the apparatus.

FIG. 14B illustrates an example of a subfield of HE Capability Information. HE Capability Information may include TWT-related information. Also, HE Capability Information may include FD Capability field. FD Capability is an identifier for full-duplex communication capability. For example, when FD Capability is 1, a corresponding apparatus may have full-duplex communication capability. FIG. 14B illustrates an example in which a specific subfield of the HE capability element includes information regarding the full-duplex communication capability of the apparatus.

Figure 15:
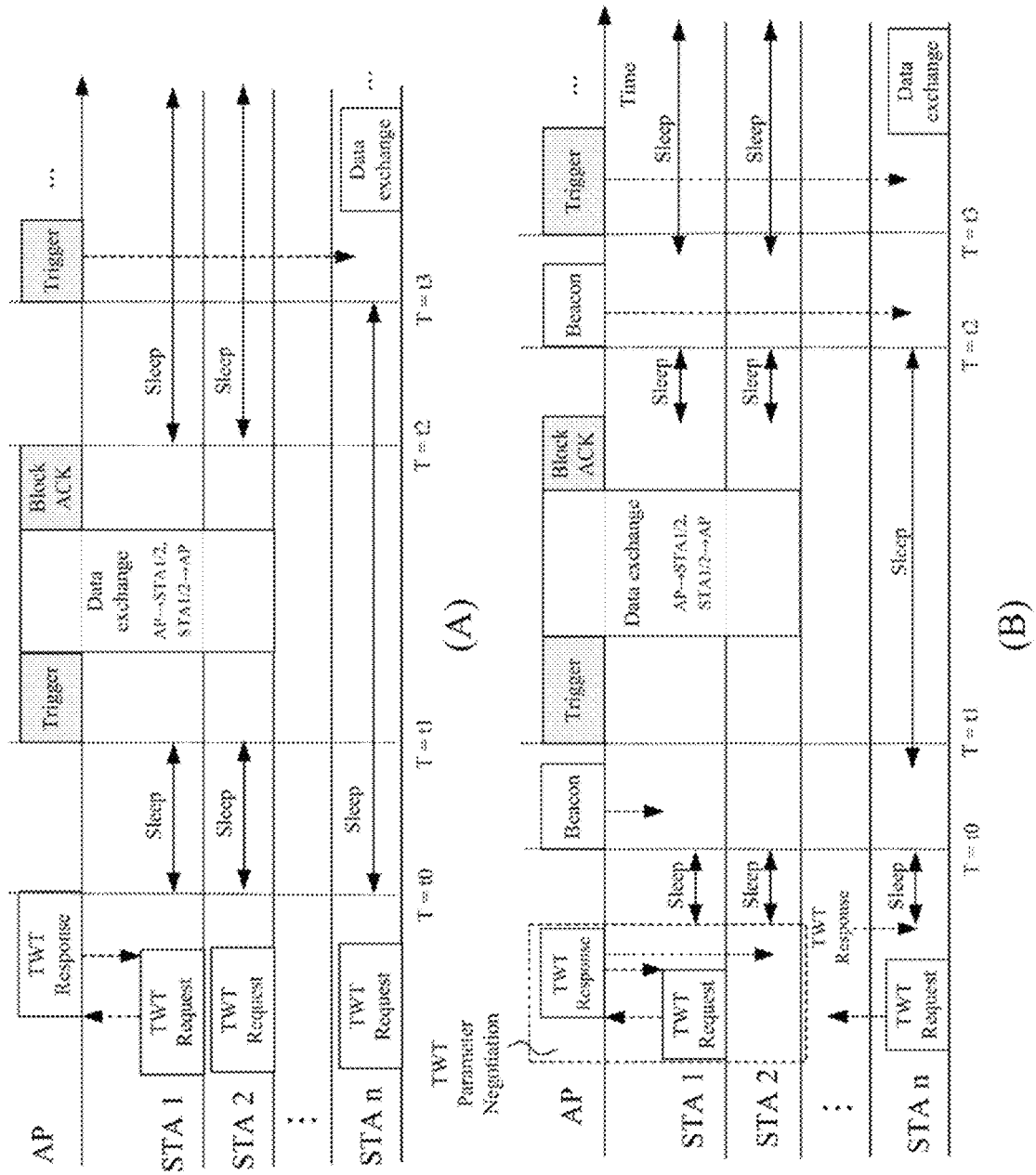
FIG. 15 illustrates another example process of performing full-duplex communication at a TWT.

FIG. 15 illustrates another example process of performing full-duplex communication at a TWT. FIG. 15 will be described using a single AP and a plurality of STAs (STA 1, STA 2, ..., STA n), as an example. It is assumed that the AP, STA 1, and STA 2 are capable of full-duplex communication. Also, it is assumed that STA n does not have full-duplex communication capability.

FIG. 15A illustrates Individual TWT agreements, as an example. For example, each of the STAs is a TWT requesting station, and the AP is a TWT responding station.

The STA and the AP perform Individual TWT agreements. In an agreement process, the AP delivers TWT schedule information to the STA. The TWT schedule information may include a wake start time for a specific STA, an interval between wake-up periods, and the like. (1) The STA transmits a TWT request frame. The TWT request frame may include an HE capability element. The STA may deliver its full-duplex communication capability to the AP through the HE capability element. Also, the TWT request frame may include a TWT IE. The STA may notify the AP of information regarding primary channel candidates that may be used in the TWT SP through the TWT IE. (2) The AP transmits a TWT response frame to the STA. The TWT response frame may include an HE capability element. The AP may notify the STA of its full-duplex communication capability through the HE capability element. Also, the TWT request frame may include the TWT IE. The AP may notify the STA of information regarding temporary primary channel during the TWT SP through the TWT IE.

In Individual TWT agreements, the AP negotiates with one STA. In some case, the AP may set a plurality of STAs into one group in advance, and transmit a common TWT scheduling to the group. It is assumed that the AP sets STA 1 and STA 2 having full-duplex communication capability to one TWT group (a first TWT group). The AP may deliver such information to STA 1 and STA 2 through the TWT IE. It is also assumed that the AP sets STA n with no full-duplex communication capability to a second TWT group. The AP delivers different wake-up times to the first TWT group and the second TWT group.

According to a TWT agreement, the STAs operate in the sleep mode for a certain time. According to a TWT agreement, STA 1, STA 2, and STA n enter the sleep mode at t0. STA 1 and STA 2 wake up before t1. The AP transmits a trigger frame to STA 1 and STA 2. The trigger frame may include RU allocation information for a data exchange during the TWT SP. The RU allocation information may be delivered through the information (control field) of the MAC layer which has been described in FIG. 12. During the TWT SP, the AP and STA 1 exchange data, and the AP and STA 2 exchange data. By the above-described method, the AP and STA 1 may perform full-duplex communication, and the AP and STA 2 may perform full-duplex communication. For example, the HE TB FD PPDU transmitted by the AP may be transmitted in a time period of the HE modulated field of the HE TB PPDU transmitted by STA 1 or STA 2. STA 1 and STA 2 re-enter the sleep mode at T2 after the TWT SP ends.

Meanwhile, according to a TWT agreement, STA n may wake up at t3 and receive a trigger frame from the AP. Subsequently, the AP and STA n perform a data exchange using time division duplex (TDD).

FIG. 15B illustrates Broadcast TWT, as an example. The STA may negotiate TWT parameters with AP in Broadcast TWT in advance. This process is optional. FIG. 15B illustrates an example in which the STA 1 transmits a TWT request frame. The TWT request frame may include an HE capability element. The STA may notify the AP of its full-duplex communication capability through the HE capability element. The TWT request frame may include a TWT IE. The STA may notify the AP of information regarding primary channel candidates that may be used in the TWT SP through the TWT IE.

In Broadcast TWT, the AP may transmit a TWT response frame as a response to the TWT request. The AP may transmit unsolicited TWT response frame to STA 2 which belongs to the same group with STA 1.

The STA which receives TWT respond frame during negotiation waits for a beacon signal of the AP, entering doze mode. The AP delivers TWT schedule information to the STA through a beacon. The TWT schedule information may include a wake start time for a specific STA, an interval between wake-up periods, and the like.

In this case, the beacon may include an HE capability element. The AP may notify the STA of its full-duplex communication capability through the HE capability element. The beacon may include a TWT IE. The AP may notify the STA of information regarding temporary primary channel during the TWT SP through the TWT IE.

It is assumed that the AP sets STA 1 and STA 2 having full-duplex communication capability to one TWT group (a first TWT group). The AP may deliver such information to STA 1 and STA 2 through the TWT IE. It is also assumed that the AP sets STA n with no full-duplex communication capability to a second TWT group. The AP delivers different wake-up times to the first TWT group and the second TWT group.

When the broadcast mode starts, the STAs operate in the sleep mode. STA 1, STA 2, and STA n wake up before a beacon is received at to.

STA 1 and STA 2 find information regarding STA 1 and STA 2 from the TWT IE and maintain the wake-up state. The AP transmits a trigger frame to STA 1 and STA 2. The trigger frame may include RU allocation information for a data exchange during the TWT SP. The RU allocation information may be delivered through the information (control field) of the MAC layer which has been described in FIG. 12. During the TWT SP, the AP and STA 1 exchange data, and the AP and STA 2 exchange data. By the above-described method, the AP and STA 1 may perform full-duplex communication, and the AP and STA 2 may perform full-duplex communication. For example, the HE TB FD PPDU transmitted by the AP may be transmitted in a time period of the HE modulated field of the HE TB PPDU transmitted by STA 1 or STA 2. STA 1 and STA 2 re-enter the sleep mode after the TWT SP ends. Subsequently, STA 1 and STA 2 re-wake up before T2. A period in which the STA wakes up may be equal to a beacon transmission period. For example, the wake-up period may be one or more beacon interval.

STA 1 and STA 2 re-receive the beacon at T2. STA 1 and STA 2 do not find information regarding STA 1 and STA 2 from the TWT IE of the beacon, and thus enter the sleep mode.

STA n does not find information regarding STA n from the TWT IE at t0. Accordingly, STA n continuously maintains the sleep mode. STA n wakes up before t2 and receives a beacon signal. STA n finds information regarding STA n from the TWT IE at t2 and maintains the wake-up state. Subsequently, STA n receives a trigger frame from the AP. The trigger frame may include RU allocation information for a data exchange during the TWT SP. The RU allocation information may be delivered through the information (control field) of the MAC layer which has been described in FIG. 12. The AP and STA n perform a data exchange using TDD during the TWT SP.

Figure 16:
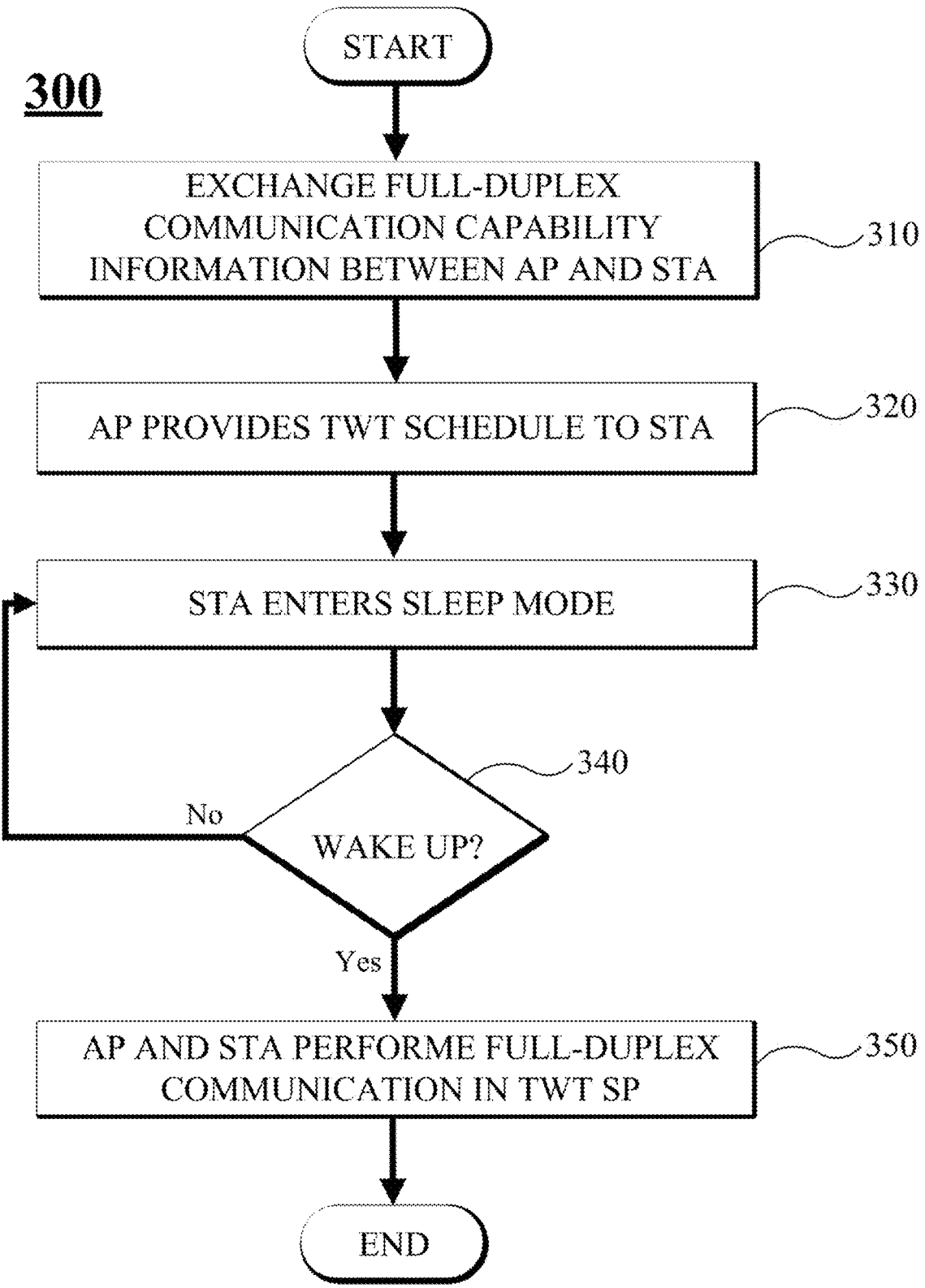
FIG. 16 illustrates an example flowchart of a process of performing full-duplex communication at a TWT.

FIG. 16 illustrates an example flowchart of a process 300 of performing full-duplex communication at a TWT. FIG. 16 illustrates an example of a full-duplex communication process in the TWT SP. FIG. 16 illustrates an operation in one TWT SP, as an example. The AP and the STA may repeatedly perform full-duplex communication in the TWT SP.

First, the AP and the STA exchange full-duplex communication capability information with each other (310). For example, as described above, the AP and the STA may deliver full-duplex communication capability through an HE capability element. The AP recognizes the full-duplex communication capability of the STA and sets a certain TWT schedule to provide the TWT schedule to the STA (320). The TWT schedule information may be delivered through a TWT IE.

The STA enters the sleep mode at the TWT (330). The STA wakes up at a certain time according to a predetermined schedule or according to information of the beacon received from the AP. The STA checks whether to wake up on a time basis (340). The STA maintains the sleep mode before the wake up time. The STA receives a trigger frame from the AP after the wake-up. The STA communicates with the AP using allocated RUs through the trigger frame. In the TWT SP, the AP and the STA perform full-duplex communication (350).

Figure 17:
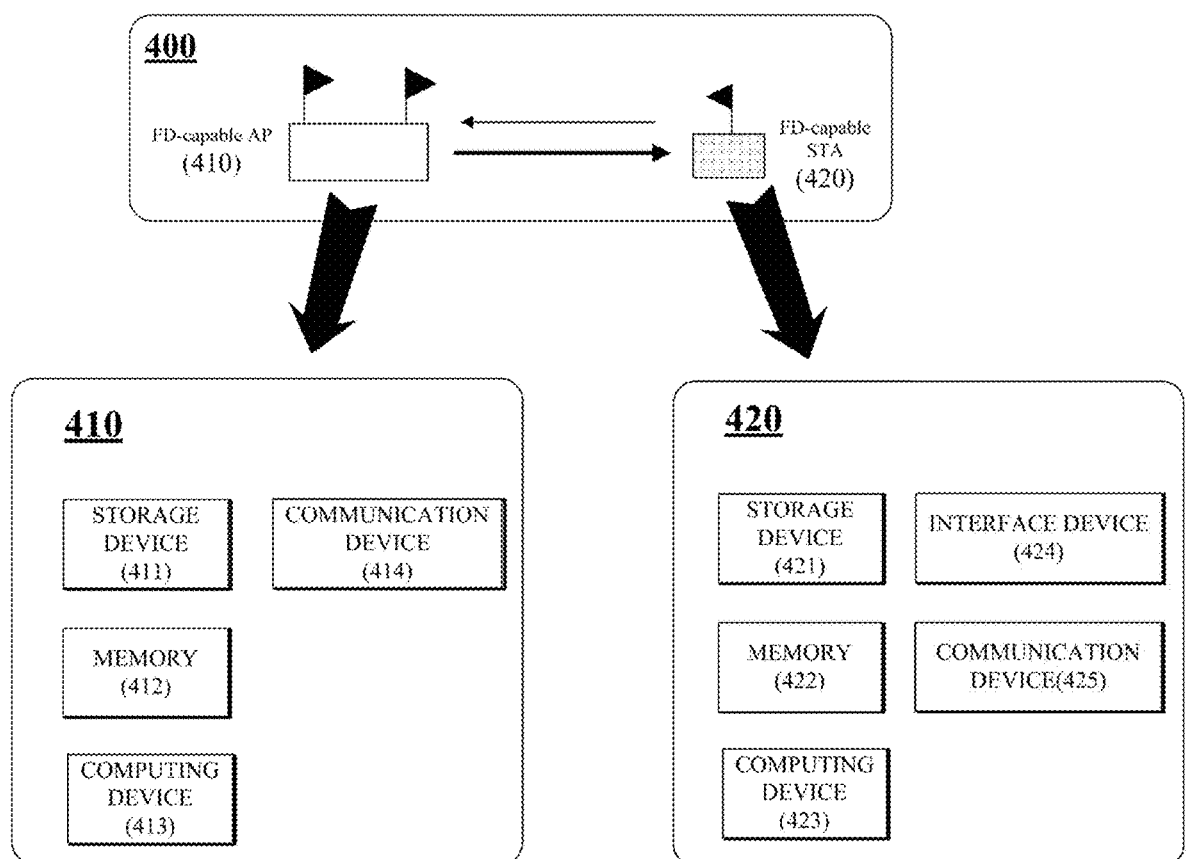
FIG. 17 illustrates an example block diagram of an AP and an STA.

FIG. 17 illustrates an example block diagram of an AP 410 and an STA 420. FIG. 17 illustrates a BSS including a single AP 410 and a single STA 420, as an example. It is assumed that the AP 410 and the STA 420 are apparatuses capable of full-duplex communication.

The AP 410 includes a storage device 411, a memory 412, a computing device 413, and a communication device 414. FIG. 17 illustrates the storage device 411, the memory 412, the computing device 413, and the communication device 414 as separate independent elements. At least two of the storage device 411, the memory 412, the computing device 413, and the communication device 414 may be configured in an integrated manner.

The storage device 411 stores a source code or program for WLAN communication with the STA. The storage device 411 stores information regarding high-efficiency WLAN communication by default. The storage device 411 may store the above-described information for full-duplex communication. The storage device 411 may store TWT operation information. The storage device 411 may store information for performing full-duplex communication in the TWT SP process. The storage device 411 may be implemented in the form of a hard disk, a read-only memory (ROM), a flash memory, or the like. The storage device 411 may store data to be transmitted and data received.

The memory 412 may temporarily store data generated while the AP 410 performs communication.

The communication device 414 refers to an element for receiving and transmitting data through WLAN communication. The communication device 414 may include at least one antenna and a communication module. The communication device 414 may include a plurality of antennas for MIMO. The communication device 414 may receive packets from at least one STA. Also, the communication device 414 may transmit packets to at least one STA. The communication device 414 may receive program update information from an external object.

The computing device 413 may transmit and receive data (packets) using a program stored in the storage device 411. The computing device 413 may transmit a reference frame to at least one STA through the communication device 414 according to a received command or a generated command. The communication device 414 may receive an uplink frame from an STA in a specific time period determined on the basis of the reference frame. The computing device 413 may transmit a downlink frame to an STA through the communication device 414 in a specific time duration of the time period in which the downlink frame is received. In this case, the computing device 413 may transmit a downlink frame to the STA having transmitted the uplink or another STA. In this case, the computing device 413 may perform control such that the downlink frame is transmitted to an HE modulated field of the uplink frame.

The computing device 413 may check the full-duplex communication capability of the STA in the TWT operation process. The computing device 413 may determine STAs having full-duplex communication capability as one group. The computing device 413 may set a TWT schedule for the STA group. The computing device 413 may determine a temporary primary channel (TWT SP TPCH) for the TWT SP. The computing device 413 may determine an RU for full-duplex communication with the STA in the TWT SP TPCH. The computing device 413 may generate a frame including RU allocation information. The computing device 413 may be a device for processing data and performing certain computation, such as a processor, an AP, and a chip with an embedded program. The communication device 414 transmits the RU allocation information and information regarding the TWT SP TPCH.

For example, the AP 410 may transmit the information regarding the TWT SP TPCH to the STA 420 as a TWT response corresponding to a TWT request. Also, the AP 410 may transmit RU information allocated in the range of TWT SP TPCH to the STA 420. During the TWT SP, the AP 410 may transmit a trigger frame to the STA 420 using an allocated RU. The AP 410 may receive an HE TB PPDU from the STA 420 in a specific time period. In this case, the AP 410 may transmit an HE TB FD PPDU to the STA 420 or another STA in a period in which an HE modulated field of the HE TB PPDU is transmitted.

Although not shown in FIG. 17, the AP 410 may include an element for canceling SI to perform full-duplex communication.

The STA 420 includes a storage device 421, a memory 422, a computing device 423, an interface device 424, and a communication device 425. FIG. 17 illustrates the storage device 421, the memory 422, the computing device 423, the interface device 424, and the communication device 425 as separate independent elements. At least two of the storage device 421, the memory 422, the computing device 423, the interface device 424, and the communication device 425 may be configured in an integrated manner.

The storage device 421 stores a source code or program for WLAN communication with the AP. The storage device 421 stores information for high-efficiency WLAN communication by default. The storage device 421 may store the above-described information for full-duplex communication. The storage device 421 may store TWT operation information. The storage device 421 may store information for performing full-duplex communication in the TWT SP process. The storage device 421 may be implemented in the form of a hard disk, a ROM, a flash memory, or the like. The storage device 421 may store data to be transmitted and data received.

The memory 422 may temporarily store data generated while the STA 420 performs communication.

The interface device 424 is a device for receiving certain commands or data from the outside. The interface device 424 may receive certain commands or data from an external storage device or an input device that is physically connected to the interface device 424. The interface device 424 may receive a command for communication with the AP 410, control information, data to be transmitted, or the like.

The communication device 425 refers to an element for transmitting and receiving data through WLAN communication. The communication device 425 may include at least one antenna and a communication module. The communication device 425 may include a plurality of antennas for MIMO. The communication device 425 may receive packets from the AP. Also, the communication device 425 may transmit packets to the AP. The communication device 425 may receive program update information from an external object.

The computing device 423 may transmit and receive data (packets) using a program stored in the storage device 421. The communication device 425 may receive a reference frame from the AP 410. The computing device 423 may determine a specific time period on the basis of the reference frame. The computing device 423 may transmit an uplink frame to the AP through the communication device 425 in the determined specific time period. The computing device 423 may generate a TWT request frame for TWT request. The computing device 423 may determine a temporary primary channel candidate for the TWT SP in the TWT operation process. The computing device 423 may be a device for processing data and performing certain computation, such as a processor, an AP, and a chip with an embedded program.

The communication device 425 may receive information regarding the TWP SP TPCH. The communication device 425 receives RU information for the TWP SP. The communication device 425 may receive a downlink frame from the AP 410 in a specific time duration of the period in which the uplink frame is transmitted, through an allocated RU during the TWP SP. In this case, the downlink frame may be received in a region where an HE modulated field of the uplink frame is placed. The computing device 423 may control the communication device 425 such that the downlink frame is received at the same time as the uplink frame is transmitted.

For example, the STA 420 may transmit a TWT request frame to the AP 410. The STA 420 may receive the information regarding the TWT SP TPCH as a TWT response. The STA 420 may receive a trigger frame from the AP 420 during the TWT SP. The STA 420 may exchange data with the AP 410 through the allocated RU. The STA 420 may transmit the HE TB PPDU in a specific time period on the basis of the trigger frame. The STA 420 may receive the HE TB FD PPDU from the AP 410 while transmitting the HE TB PPDU. The HE TB FD PPDU may be received in a period in which the HE modulated field of the HE TB PPDU is transmitted.

Although not shown in FIG. 17, the STA 420 may include an element for canceling SI to perform full-duplex communication.

Also, the above-described full-duplex communication method may be implemented using a program (or application) including an executable algorithm that may be executed by a computer. The full-duplex communication method may be embedded into an AP and an STA.

The program may be stored and provided in a non-transitory computer readable medium. The non-transitory computer readable medium refers not to a medium that temporarily stores data such as a register, a cache, and a memory but to a medium that semi-permanently stores data and that is readable by a device. Specifically, the above-described various applications or programs may be provided while being stored in a non-transitory computer readable medium such as a compact disc (CD), a digital versatile disc (DVD), a hard disk, a Blu-ray disc, a Universal Serial Bus (USB), a memory card, a ROM, etc.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A full-duplex communication method in a target wake time (TWT) service period of a high-efficiency wireless local area network (WLAN), the full-duplex communication method being performed by a TWT responding station, the method comprising:
    transmitting TWT schedule information to at least one TWT requesting station;
    transmitting information regarding a resource unit (RU) to the at least one TWT requesting station through a reference frame in a TWT service period (SP);
    receiving an uplink frame from the TWT requesting station in at a specific timing determined based on the reference frame through the RU; and
    transmitting a downlink frame to the TWT requesting station at the specific timing,
    wherein the uplink frame and the downlink frame synchronized at the specific timing are transmitted simultaneously in a same time period on a basis of the reference frame through a same channel,
    wherein a duration of a legacy part of the uplink frame and a duration of a legacy part of the downlink frame are same, and
    wherein the legacy part of the downlink frame includes a null field in which no signal is transmitted or another signal type is transmitted.

2. The full-duplex communication method of claim 1, wherein the TWT responding station pre-receives candidates channel information regarding temporary primary channel for the TWT SP from the TWT requesting station and determines the information regarding the RU for the temporary primary channel.

3. The full-duplex communication method of claim 1, wherein the TWT responding station receives full-duplex communication capability information from the at least one TWT requesting station and sets the TWT schedule information for the at least one TWT requesting station having a full-duplex communication capability.

4. The full-duplex communication method of claim 3, wherein the full-duplex communication capability information is delivered through an HE capability element.

5. The full-duplex communication method of claim 1, wherein the uplink frame is a High-Efficiency Trigger-Based (HE TB) PPDU.

6. The full-duplex communication method of claim 1,
wherein the legacy part of the uplink frame includes a pre-HE modulated field of the uplink frame and a non-legacy part of the uplink frame includes an HE modulated field of the uplink frame,
wherein a non-legacy part of the downlink frame includes an HE modulated field of the downlink frame, and
wherein the specific timing is included in the same time period in which the HE modulated field of the uplink frame is received and the HE modulated field of the downlink frame is transmitted.

7. The full-duplex communication method of claim 1, wherein channel information for TWT SP is included in a channel information field of a TWT information element.

8. A full-duplex communication method in a target wake time (TWT) service period of a high-efficiency wireless local area network (WLAN), the full-duplex communication method being performed by a TWT requesting station, the method comprising:
entering a sleep mode;
receiving a reference frame including information regarding a resource unit (RU) in a target channel for a TWT service period (SP) from a TWT responding station after waking up;
transmitting an uplink frame to the TWT responding station at a specific timing determined on a basis of the reference frame through the RU; and
receiving a downlink frame from the TWT responding station at the specific timing,
wherein the uplink frame and the downlink frame synchronized at the specific timing are transmitted simultaneously in a same time period on a basis of the reference frame through a same channel,
wherein a duration of a legacy part of the uplink frame and a duration of a legacy part of the downlink frame are same, and
wherein the legacy part of the downlink frame includes a null field in which no signal is transmitted or another signal type is transmitted.

9. The full-duplex communication method of claim 8, wherein the TWT requesting station pre-transmits candidate channel information regarding temporary primary channel for the TWT SP to the TWT responding station, and the target channel is determined among candidate channels.

10. The full-duplex communication method of claim 8, wherein the uplink frame is a High-Efficiency Trigger-Based (HE TB) PPDU.

11. The full-duplex communication method of claim 8,
wherein the legacy part of the uplink frame includes a pre-HE modulated field of the uplink frame and a non-legacy part of the uplink frame includes an HE modulated field of the uplink frame,
wherein a non-legacy part of the downlink frame includes an HE modulated field of the downlink frame, and
wherein the specific timing is included in the same time period in which the HE modulated field of the uplink frame is received and the HE modulated field of the downlink frame is transmitted.

12. The full-duplex communication method of claim 8, wherein the TWT requesting station transmits full-duplex communication capability information to the TWT responding station.

13. The full-duplex communication method of claim 12, wherein the full-duplex communication capability information is transmitted through an HE capability element.

14. A station apparatus for performing full-duplex communication in a power saving mode of a high efficiency wireless local area network (WLAN), the station apparatus comprising:
a communication device configured to receive a reference frame including information regarding a resource unit (RU) for a target wake time (TWT) service period (SP) from an access point (AP) in a WLAN network, receive a downlink frame from the AP at a specific timing, and transmit an uplink frame at the specific timing; and
a processor configured to determine to switch into a wake-up mode in a specific time after entering a sleep mode at a TWT, determine the the specific timing from the reference frame, and process the downlink frame,
wherein the reference frame is received in the wake-up mode,
wherein the uplink frame and the downlink frame synchronized at the specific timing are transmitted simultaneously in a same time period on a basis of the reference frame through a same channel,
wherein a duration of a legacy part of the uplink frame and a duration of a legacy part of the downlink frame are same, and
wherein the legacy part of the downlink frame includes a null field in which no signal is transmitted or another signal type is transmitted.

15. The station apparatus of claim 14, wherein the communication device transmits a High-Efficiency Trigger-Based (HE TB) PPDU to the AP as the uplink frame.

16. The station apparatus of claim 14,
wherein the legacy part of the uplink frame includes a pre-HE modulated field of the uplink frame and a non-legacy part of the uplink frame includes an HE modulated field of the uplink frame,
wherein a non-legacy part of the downlink frame includes an HE modulated field of the downlink frame, and
wherein the specific timing is included in the same time period in which the HE modulated field of the uplink frame is received and the HE modulated field of the downlink frame is transmitted.

17. The station apparatus of claim 14, wherein the communication device transmits an HE capability element including full-duplex communication capability information thereof to the AP.

* * * * *